United States Patent
Lee et al.

(10) Patent No.: US 9,483,943 B2
(45) Date of Patent: Nov. 1, 2016

(54) DEVICE AND METHOD OF DETECTING PARKING SPACE

(71) Applicant: HYUNDAI MOBIS Co., Ltd, Seoul (KR)

(72) Inventors: Yong Ju Lee, Yongin-si (KR); Min Hwan Wi, Yongin-si (KR); Jin Young Oh, Seoul (KR); Ik Su Shin, Seoul (KR); Jae Ho Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/524,215

(22) Filed: Oct. 27, 2014

(65) Prior Publication Data

US 2016/0063861 A1    Mar. 3, 2016

(30) Foreign Application Priority Data

Aug. 27, 2014  (KR) .................. 10-2014-0112612

(51) Int. Cl.
*G08G 1/14*     (2006.01)
*G01S 15/93*    (2006.01)

(52) U.S. Cl.
CPC .............. *G08G 1/14* (2013.01); *G01S 15/931* (2013.01); *G01S 2015/935* (2013.01)

(58) Field of Classification Search
CPC ............. B62D 15/027; B62D 15/028; B62D 15/0285; G08G 1/168; G08G 1/14; G01S 15/931; G01S 2015/935; G06K 9/00812
USPC ........ 340/932.2, 435, 903; 348/148; 342/70, 342/71; 701/300, 301; 367/99
See application file for complete search history.

(56) References Cited

U.S. PATENT DOCUMENTS 7,492,282 B2    2/2009  Danz et al.
7,660,205 B2 *  2/2010  Barth .................... G01S 15/931
                                                                367/99
2007/0124106 A1  5/2007  Gotzig et al.
2009/0322565 A1* 12/2009 Faber ................... B62D 15/027
                                                                340/932.2
2011/0057814 A1* 3/2011  Park ..................... B60W 10/18
                                                                340/932.2

(Continued)

FOREIGN PATENT DOCUMENTS

JP       2013-189076 A    9/2013
JP       2013-212808 A   10/2013
KR  10-2013-0089502 A    8/2013

OTHER PUBLICATIONS

European Search Report issued on Aug. 21, 2015 in counterpart European Application No. 14188823.0 (3 pages in English).

Primary Examiner — Thomas Mullen
(74) Attorney, Agent, or Firm — NSIP Law

(57) ABSTRACT

A device for detecting a parking space includes: a signal pre-processing unit configured to filter ultrasonic signals emitted from ultrasonic sensors attached to a vehicle, and reflected and returned from a corner section of an obstacle; a corner estimating unit configured to extract a crossing point of a plurality of circles each having a measurement distance as a radius, wherein the measurement distances are collected from the received ultrasonic signals according to a movement of the vehicle, estimate a reflection angle between a first line for bisecting a detection region of the ultrasonic sensor, which has an attachment position of the ultrasonic sensor as a reference point, and a second line for connecting the reference point and the crossing point, and estimate the corner section based on the estimated reflection angle; and a parking space detecting unit configured to detect a parking space according to the estimated corner section.

16 Claims, 20 Drawing Sheets

(56) References Cited

U.S. PATENT DOCUMENTS

| | | | | |
|---|---|---|---|---|
| 2011/0082613 A1* | 4/2011 | Oetiker | ............... | B60W 10/20 701/41 |
| 2011/0121994 A1* | 5/2011 | Pampus | ............... | B62D 15/027 340/932.2 |
| 2011/0140921 A1* | 6/2011 | Pampus | ............... | B62D 15/027 340/932.2 |
| 2012/0062396 A1 | 3/2012 | Inoue et al. | | |
| 2014/0097971 A1* | 4/2014 | Barth | ............... | G01S 7/52004 340/932.2 |

* cited by examiner

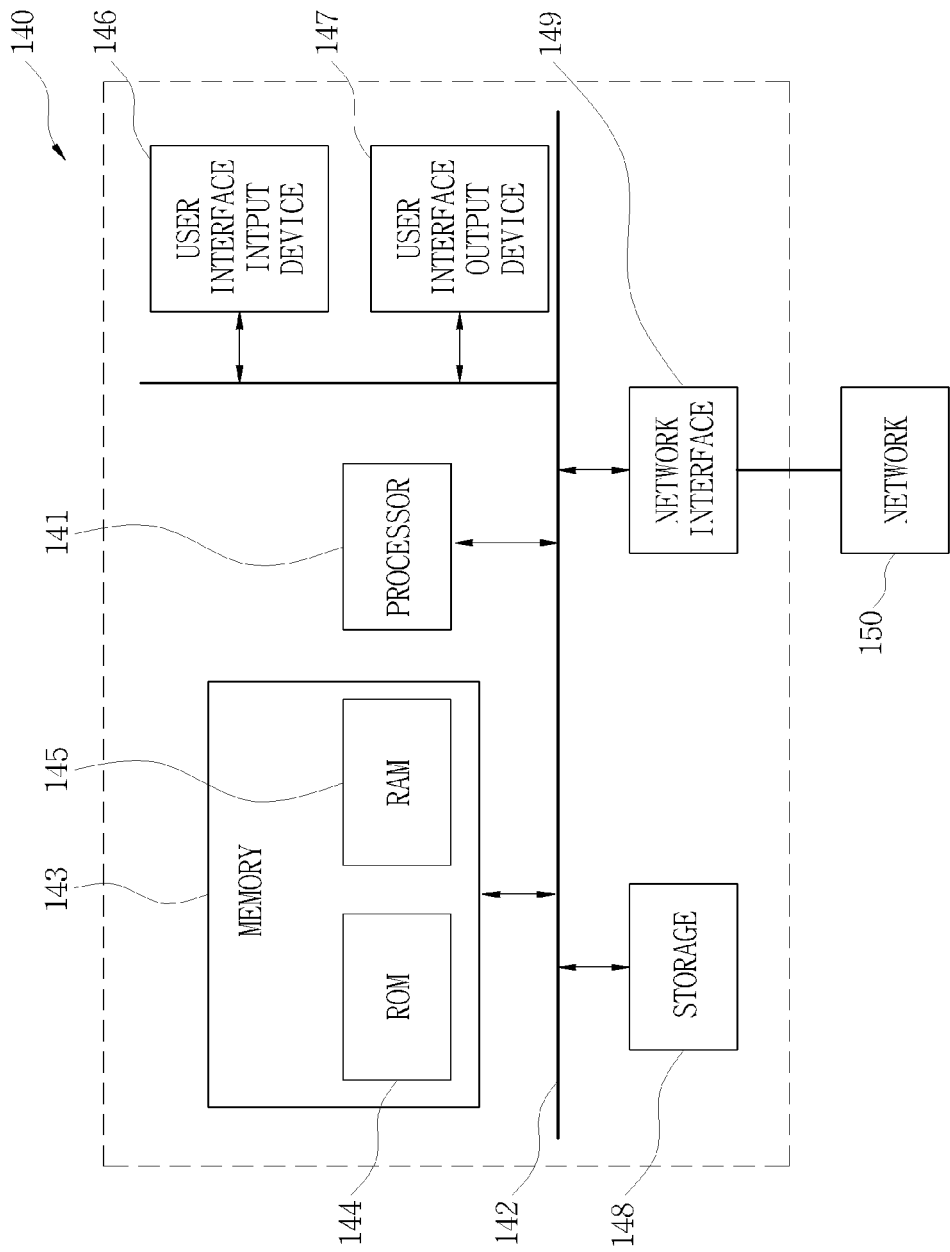

DEVICE AND METHOD OF DETECTING PARKING SPACE

CROSS-REFERENCE TO RELATED APPLICATIONS

This application claims priority under 35 U.S.C. §119 to Korean Patent Application No. 10-2014-0112612, filed on Aug. 27, 2014, in the Korean Intellectual Property Office, the disclosure of which is incorporated herein by reference in its entirety.

TECHNICAL FIELD

The present invention relates to a device and a method of detecting a parking space by using an ultrasonic sensor in a smart parking assist system (SPAS).

BACKGROUND

Recently, a smart parking assist system (SPAS) for supporting reverse parallel parking, perpendicular parking, and the like has been developed.

The SPAS may include a plurality of ultrasonic sensors, an electronic stability controller (ESC), a motor driven power steering system (MDPS), an SPAS electronic control unit (ECU), a human machine interface (HMI), and the like as illustrated in FIG. 1A.

In general, a plurality of ultrasonic sensors mounted in a vehicle includes 8 (8EA) front and rear ultrasonic sensors and four (4EA) lateral ultrasonic sensors, and the front and rear ultrasonic sensors detect obstacles in a longitudinal direction based on a travelling direction of a vehicle, and the lateral ultrasonic sensors detect obstacles in a transverse direction. The information about the detected obstacle is transmitted to the SPAS ECU.

As illustrated in FIG. 1B, the SPAS ECU detects a position of the obstacle and a parking space based on the information about the detected obstacle (S12). The SPAS ECU detects a parking trace for parking the vehicle in the detected parking space, and transmits a steering command corresponding to the detected parking trace to a steering device (S14).

The SPAS ECU controls steering of the vehicle according to the steering command by using the steering device (S16), and then completes assistance of smart parking of the vehicle by aligning a posture of the vehicle (S18).

As described above, the SPAS performs various processes, and process S12 of detecting the parking space, which is first performed among the various processes, is a very important process considerably influencing the parking trace generation and the parking completion performance of the vehicle.

Accordingly, in the process of detecting the parking space, the parking space and the obstacle need to be accurately recognized, but the ultrasonic sensor used in the SPAS in the related art has a limit to the performance of accurately recognizing a parking space and an object, other than the measurement of a distance to the obstacle.

Nevertheless, it is difficult to replace the ultrasonic sensor with another sensor in the SPAS of the related art in respect to a cost aspect.

SUMMARY

The present invention has been made in an effort to provide a device and a method of detecting a parking space, which are capable of improving parking space detecting performance by using an existing ultrasonic sensor.

An exemplary embodiment of the present invention provides a device for detecting a parking space, including: a signal pre-processing unit configured to filter reflection signals which are ultrasonic signals reflected and returned from a corner section of an obstacle, the ultrasonic signals being emitted from ultrasonic sensors attached to a vehicle; a pattern-based corner estimating unit configured to extract a crossing point of a plurality of circles having a plurality of measurement distances, which are collected from the reflection signals according to a movement of the vehicle as radiuses, estimate a reflection angle between a first line for bisecting a detection region within the detection region of the ultrasonic sensor, which has a current position of the ultrasonic sensor as a reference point, and a second line for connecting the reference point and the crossing point, and estimate the corner section of the obstacle based on the estimated reflection angle; and a parking space detecting unit configured to detect a parking space of the vehicle according to the estimated corner section.

Here, the pattern-based corner estimating unit may estimate the corner section of the obstacle based on a rate of change in the reflection angle according to the movement of the vehicle, and divide the corner section of the obstacle into a first section in which the reflection angle is decreased, a second section which is continued from the first section and in which the reflection angle is maintained at 0°, and a third section which is continued from the second section and in which the reflection angle is increased, to estimate the corner section of the obstacle.

The pattern-based corner estimating unit may compensate for a start point (inflection point) of the second section by a length of the first section, and compensates for an end point (inflection point) of the second section by a length of the third section, to estimate the corner section.

The pattern-based corner estimating unit may compare a length of each of the first and third sections with a predetermined length and classify a pattern of the obstacle, and when the length of each of the first and third sections is equal to or greater than the predetermined length, the pattern-based corner estimating unit may classify the obstacle into a parked vehicle pattern, and when the length of each of the first and third sections is smaller than the predetermined length, the pattern-based corner estimating unit may classify the obstacle into a square pillar pattern.

When the obstacle is classified as the square pillar pattern, the pattern-based corner estimating unit may estimate the start point and the end point of the second section as the corner section.

The device for detecting the parking space may further include: a reflection angle-based corner estimating unit configured to calculate a current position of the ultrasonic sensor, a distance to the corner section based on the reflection signal received at the current position, and the reflection angle at the current position, to estimate the corner section of the obstacle; a triangulation-based corner estimating unit configured to estimate the corner section by using estimated corner points extracted from m points (ghost echo points) (here, m is a natural number equal to or greater than 2), at which the reflection angle is increased and decreased, among points positioned at the plurality of measurement distances by using the triangulation method; and a sensor map-based corner estimating unit configured to estimate the corner section by using points received around an outer side of a sensor map in which an initially received reflection signal and a finally received reflection signal from the obstacle according to a movement of the vehicle are formed by a unique detection angle of the ultrasonic sensor.

The device for detecting the parking space may further include: a final corner estimating unit configured to add weighted result values obtained by multiplying coordinate values, which correspond to the corner sections estimated by the pattern-based corner estimating unit, the reflection angle-based corner estimating unit, the triangulation-based corner estimating unit, and the sensor map-based corner estimating unit by different weights, respectively, and estimate a result value, which is obtained by dividing the added weighted result values by a result value obtained by adding the different weight values, as a final corner section.

Another exemplary embodiment of the present invention provides a method of detecting a parking space, including: filtering reflection signals which are ultrasonic signals reflected and returned from a corner section of an obstacle, the ultrasonic signals being emitted from ultrasonic sensors attached to a vehicle; extracting a crossing point of a plurality of circles having a plurality of measurement distances collected from the reflection signals according to a movement of the vehicle as radiuses; estimating a reflection angle between a first line for bisecting a detection region within the detection region of the ultrasonic sensor, which has an attachment position of the ultrasonic sensor as a reference point, and a second line for connecting the reference point and the crossing point; pattern-based corner estimating of estimating the corner section of the obstacle based on the estimated reflection angle; and detecting a parking space of the vehicle according to the estimated corner section.

Here, the pattern-based corner estimating may include: dividing the corner section into a first section in which the reflection angle is decreased, a second section which is continued from the first section and in which the reflection angle is maintained at 0°, and a third section which is continued from the second section and in which the reflection angle is increased, based on a rate of change in the reflection angle according to the movement of the vehicle, and estimating a start point (inflection point) and an end point (inflection point) of the second section; comparing a length of each of the first and third sections with a predetermined length and classifying a pattern of the obstacle; determining the amount of compensation of the start point and the end point of the second section according to the classified pattern of the obstacle; and estimating the start point and the end point of the second section, which are compensated according to the determined amount of compensation as the corner section.

The classifying of the pattern of the obstacle may include classifying the obstacle into a vehicle pattern when the length of each of the first and third sections is equal to or greater than the predetermined length, and classifying the obstacle into a square pillar pattern when the length of each of the first and third sections is smaller than the predetermined length.

The determining of the amount of compensation may include, when the obstacle is classified as the pattern of the vehicle, determining the amount of compensation of the start point (inflection point) of the second section as the length of the first section, and determining the amount of compensation of the end point (inflection point) of the second section as the length of the third section.

The estimating of the start point and the end point of the second section as the corner section may include, when the obstacle is classified as the square pillar, estimating the start point and the end point of the second section as the corner section as they are without the amount of compensation.

The method of detecting the parking space may further include: reflection angle-based corner estimating of calculating a current position of the ultrasonic sensor, a distance to the corner section based on the reflection signal received at the current position, and the reflection angle at the current position, to estimate the corner section of the obstacle; triangulation-based corner estimating of estimating the corner section by using estimated corner points extracted from m points (ghost echo points) (here, m is a natural number equal to or greater than 2), at which the reflection angle is increased and decreased, among points positioned at the plurality of measurement distances by using a triangulation method; and sensor map-based corner estimating of estimating the corner section by using points received around an outer side of a sensor map in which an initially received reflection signal and a finally received reflection signal from the obstacle according to a movement of the vehicle are formed by a unique detection angle of the ultrasonic sensor.

The method for detecting the parking space may further include: final corner estimating of adding weighted result values obtained by multiplying coordinate values, which correspond to the corner sections estimated by the pattern-based corner estimating, the reflection angle-based corner estimating, the triangulation measurement based corner estimating, and the sensor map-based corner estimating, by different weights, respectively, and estimating a result value, which is obtained by dividing the added weighted result values by a result value obtained by adding the different weight values, as a final corner section.

According to the present invention, positions of corners of an obstacle are estimated by using an existing ultrasonic sensor, thereby improving accuracy in detecting a parking space, and ultimately improving general performance of a smart parking assist system (SPAS) of a vehicle.

BRIEF DESCRIPTION OF THE DRAWINGS

FIG. 14 is block diagram illustrating a computer system for the present invention.

DETAILED DESCRIPTION OF EMBODIMENTS

Figure 1A:
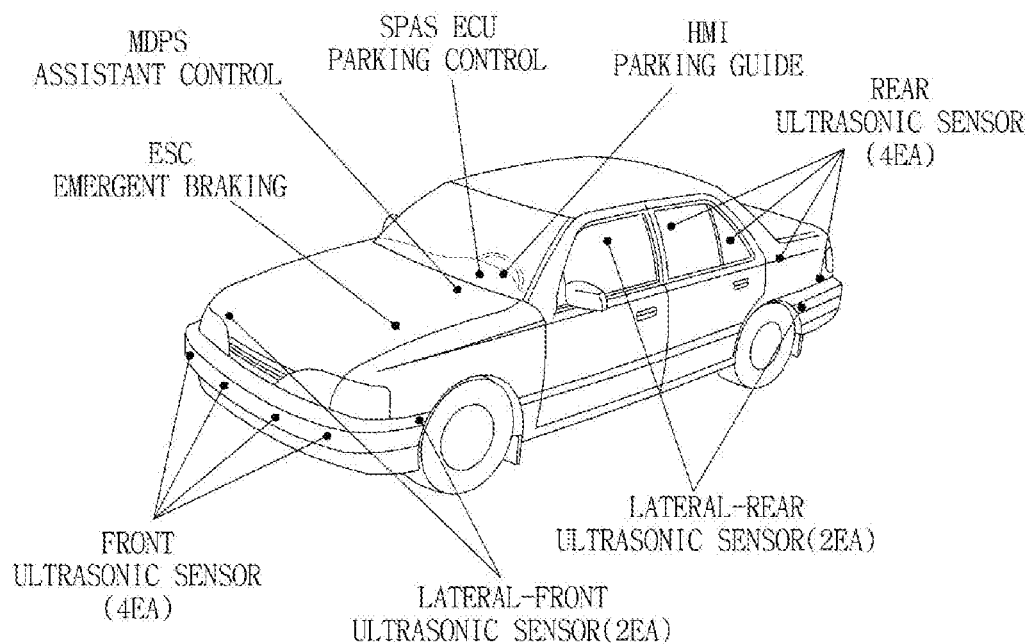
FIGS. 1A and 1B are diagrams illustrating a prior art smart parking assist system (SPAS) of a vehicle.
Figure 1B:
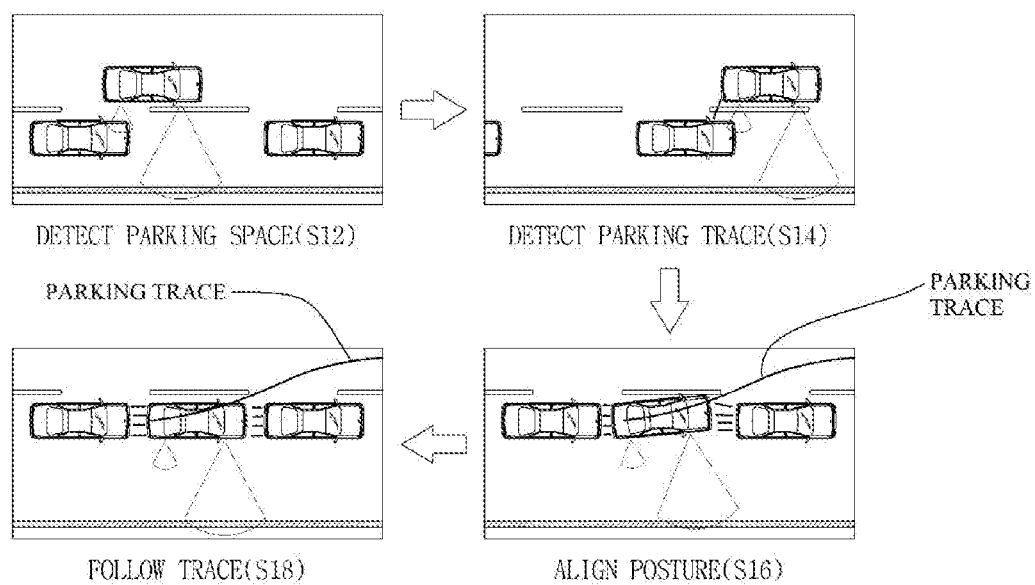

Advantages and features of the present invention and methods of achieving the advantages and features will be clear with reference to exemplary embodiments described in detail below together with the accompanying drawings. However, the present invention is not limited to exemplary embodiments disclosed herein but will be implemented in various forms. The exemplary embodiments are provided only to make disclosed contents thorough and complete and sufficiently transfer the spirit of the present invention to those skilled in the art. Therefore, the present invention will be defined by the description of the claims. Meanwhile, terminologies used in the present invention are to explain exemplary embodiments rather than limiting the present invention. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

Hereinafter, exemplary embodiments of the present invention will be described in detail with reference to the accompanying drawings. First, in giving reference numerals to elements of each drawing, like reference numerals refer to like elements even though like elements are shown in different drawings, and in describing the present invention, a detailed description of known configurations or functions incorporated herein will be omitted when it is judged that the detailed description may make the subject matter of the present invention unclear.

Figure 2:
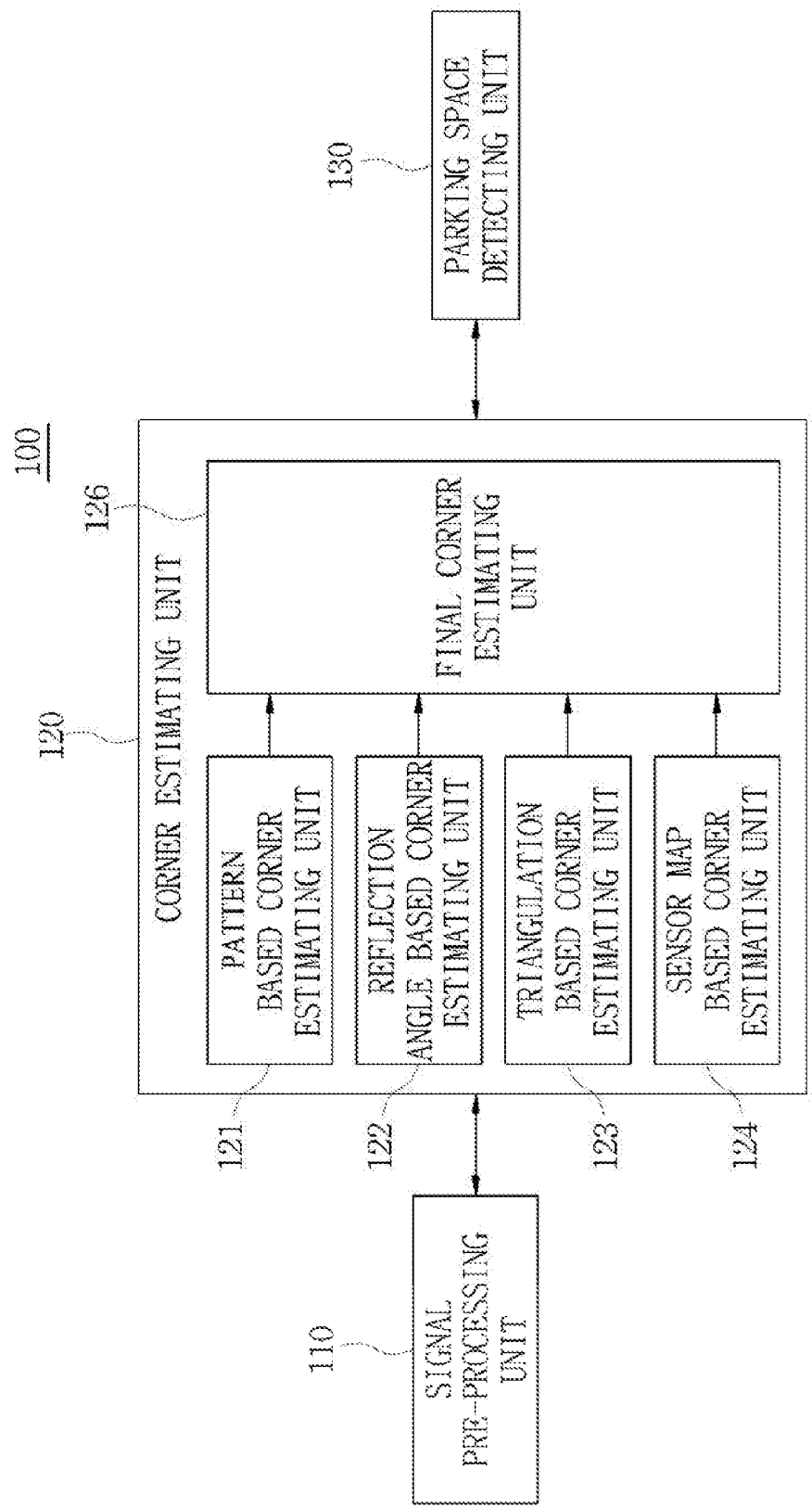
FIG. 2 is a block diagram illustrating a parking space detecting device according to an exemplary embodiment of the present invention.

FIG. 2 is a block diagram illustrating a parking space detecting device according to an exemplary embodiment of the present invention.

Referring to FIG. 2, a parking space detecting device 100 according to an exemplary embodiment of the present invention includes a signal pre-processing unit 110, a corner estimating unit 120, a parking space detecting unit 130.

Figure 3A:
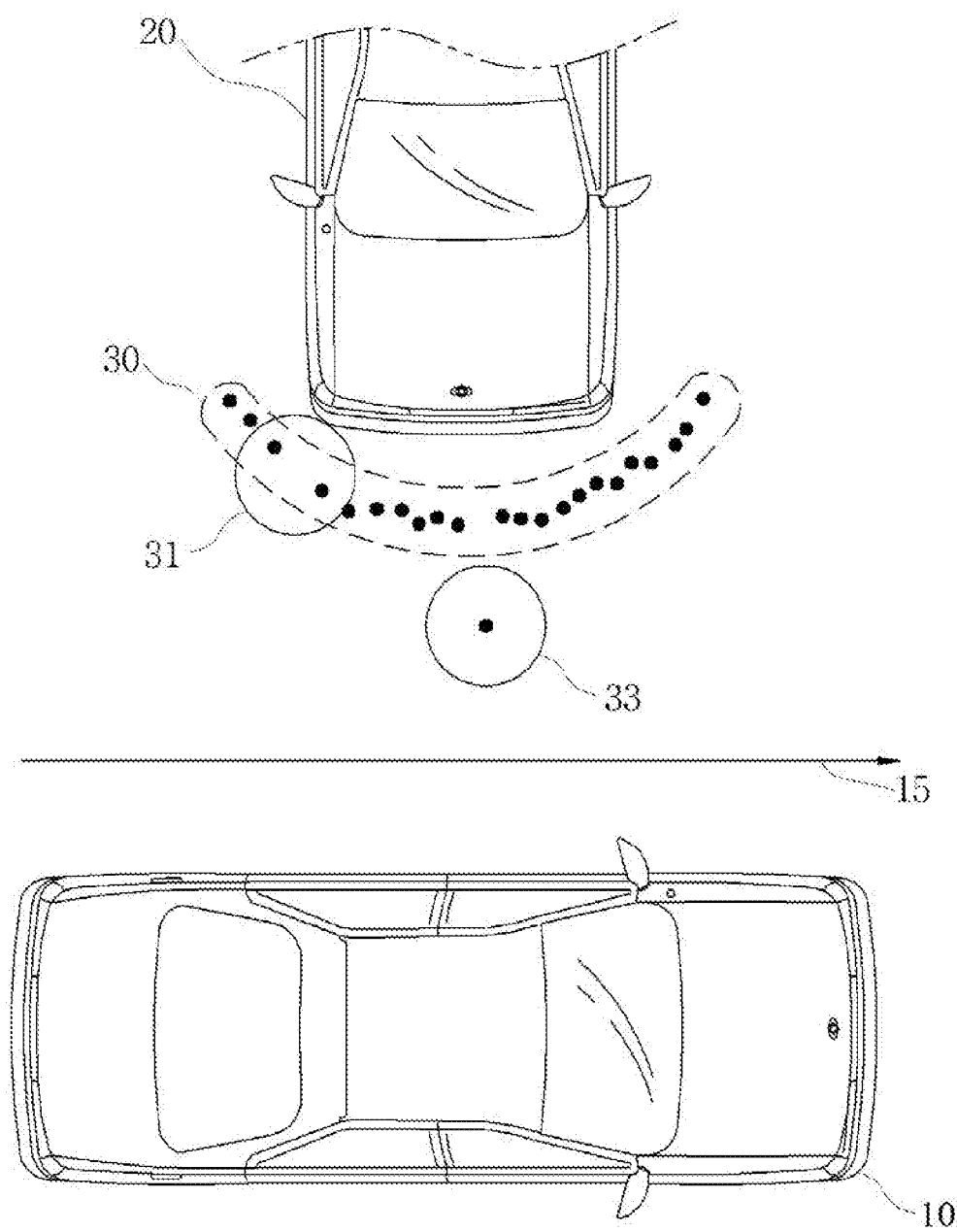
FIGS. 3A and 3B are diagrams illustrating an operation of interpolating an ultrasonic reflection signal by the parking space detecting device according to the present invention.
Figure 3B:
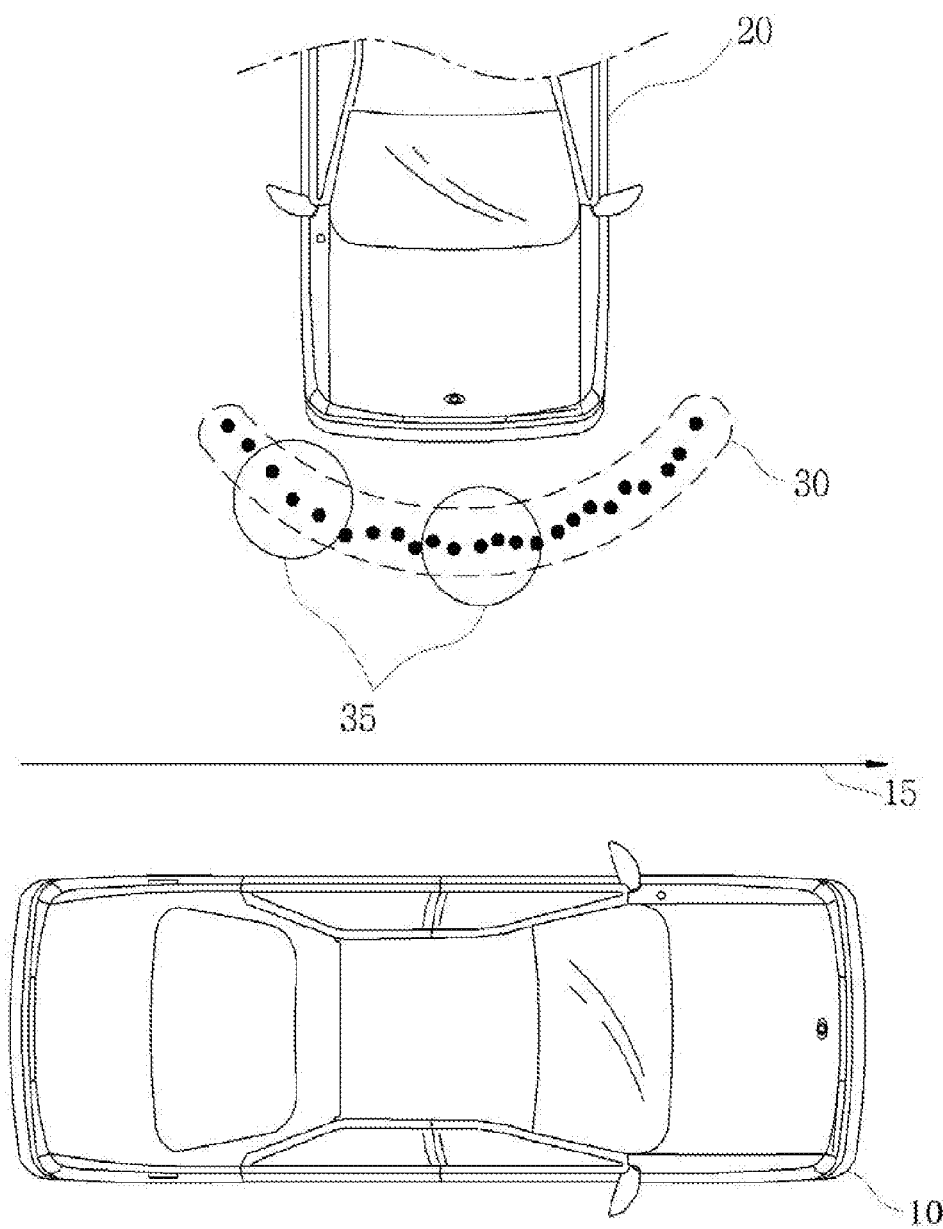

The signal pre-processing unit 110 performs a signal pre-processing process of filtering (or interpolating) reflection signals received from an ultrasonic sensor. Through the signal pre-processing process, a non-uniform reflection signal 31 or an inaccurate reflection signal 33 illustrated in FIG. 3A may be interpolated into a uniform reflection signal 35 as illustrated in FIG. 3B.

The corner estimating unit 120 estimates a corner section (corner coordinates or a corner position) of an obstacle by using the reflection signals pre-processed by the signal pre-processing unit 110.

The corner estimating unit 120 may include at least one of a pattern-based corner estimating unit 121, a reflection angle-based corner estimating unit 122, a triangulation-based corner estimating unit 123, and a sensor map-based corner estimating unit 124 according to four corner estimating methods suggested in the present invention.

The corner estimating unit 120 may further include a final corner estimating unit 126 for estimating a final corner section by calculating each corner section, which is estimated by the pattern-based corner estimating unit 121, the reflection angle-based corner estimating unit 122, the triangulation-based corner estimating unit 123, and the sensor map-based corner estimating unit 124, with a weight. A weight is assigned to each corner section estimated by the final corner estimating unit 126 to improve accuracy of the estimated corner section of the obstacle.

The parking space detecting unit 130 detects a parking space for parking the vehicle by considering the corner section estimated by the corner estimating unit 120. The parking space detecting unit 130 will be described in detail below.

Hereinafter, the corner estimating method performed by each of the pattern-based corner estimating unit 121, the reflection angle-based corner estimating unit 122, the triangulation-based corner estimating unit 123, and the sensor map-based corner estimating unit 124, which are included in the corner estimating unit 120 will be described in detail.

1. Corner Estimation Performed by the Pattern-Based Corner Estimating Unit 121

A distance to the obstacle may be measured by using the ultrasonic sensor, but a point, at which reflection is actually incurred, may not be measured by using the ultrasonic sensor.

Figure 4:
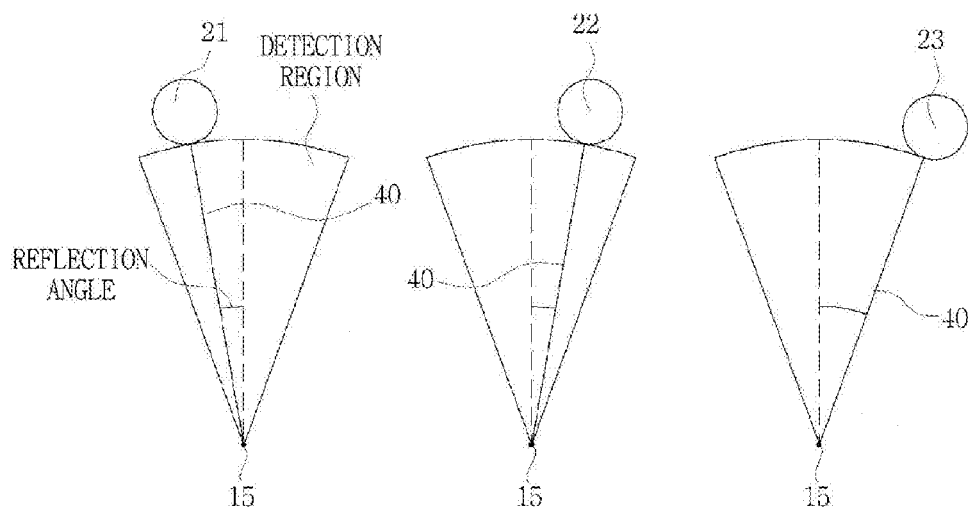
FIG. 4 is an example diagram illustrating an obstacle detection feature of the ultrasonic sensor.

That is, as illustrated in FIG. 4, it can be seen that three obstacles 21, 22, and 23, which have the same distance from the ultrasonic sensor 11, but have different positions, have the same distance by the ultrasonic sensor 11, but it is not possible to discriminate the three obstacles 21, 22, and 23 according to the points at which an ultrasonic signal is actually reflected.

Figure 5:
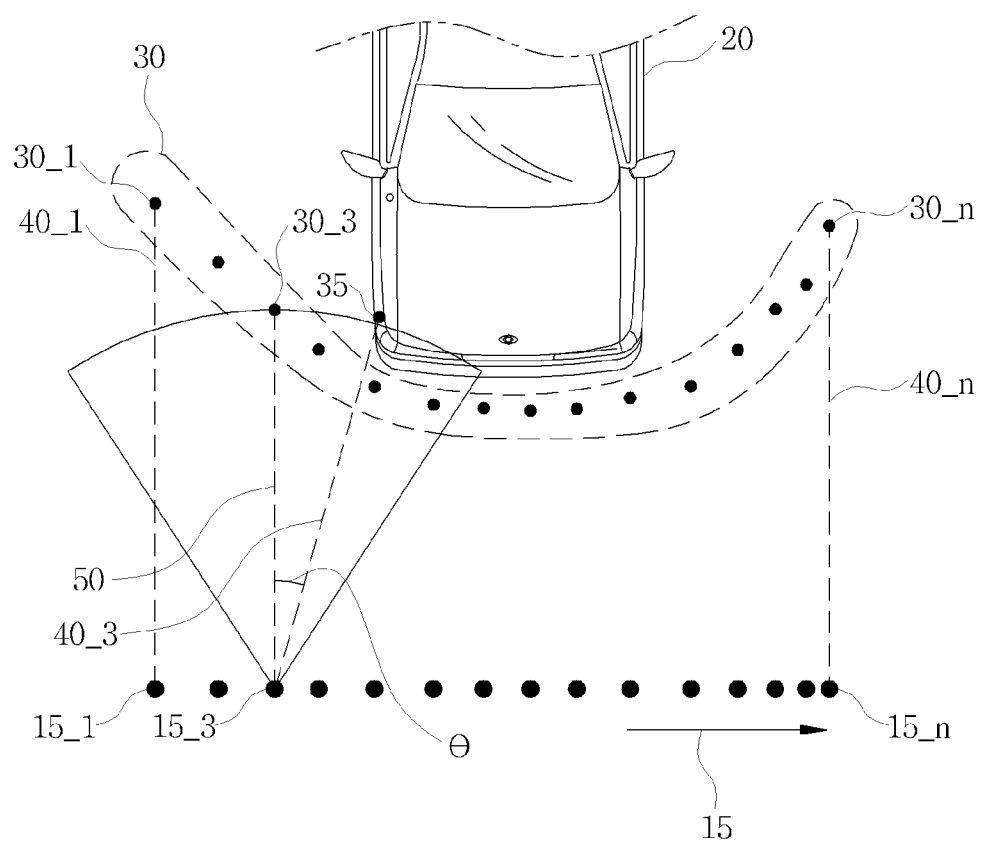
FIG. 5 is an example diagram illustrating a reflection signal modeled by the parking space detecting device according to the present invention.

As a result, when an obstacle is a parked vehicle, and the ultrasonic sensor 11 scans the parked vehicle while moving, a reflection signal received by the ultrasonic sensor cannot accurately detect a shape of a corner of the parked vehicle as illustrated in FIG. 5. That is, when an ultrasonic signal is reflected at an actual reflection point 35 at a time when the ultrasonic sensor 11 is positioned at a third position 15_3, the reflection signal is modeled to a point 30_3 having the same distance value as that of the distance to the actual reflection point 35.

As a result, since the reflection signal is modeled at the point 30_3 different from the actual reflection point 35 of the ultrasonic signal, a process of estimating a corner section of the vehicle is required so that a corner section of the parked vehicle may be accurately modeled.

Accordingly, the process of estimating the corner section based on the pattern according to the exemplary embodiment of the present invention includes a process of estimating a reflection angle, a process of estimating an inflection, a process of classifying an attribute (pattern or type) of an obstacle, and a process of determining an amount of compensation according to the classified attribute.

Referring to FIG. 5, a reflection angle ($\theta$) may be defined as an angle between a first line 50 bisecting a detection region of the ultrasonic sensor and a second line 40_3 connecting the actual reflection point 35 of the ultrasonic signal and the reference point 15_3 when a current position of the ultrasonic sensor attached to the vehicle serves as the reference point 15_3.

The reflection angle (θ) may be estimated from a plurality of measured distances collected from the reflection signal according to movement of the vehicle.

Figure 6:
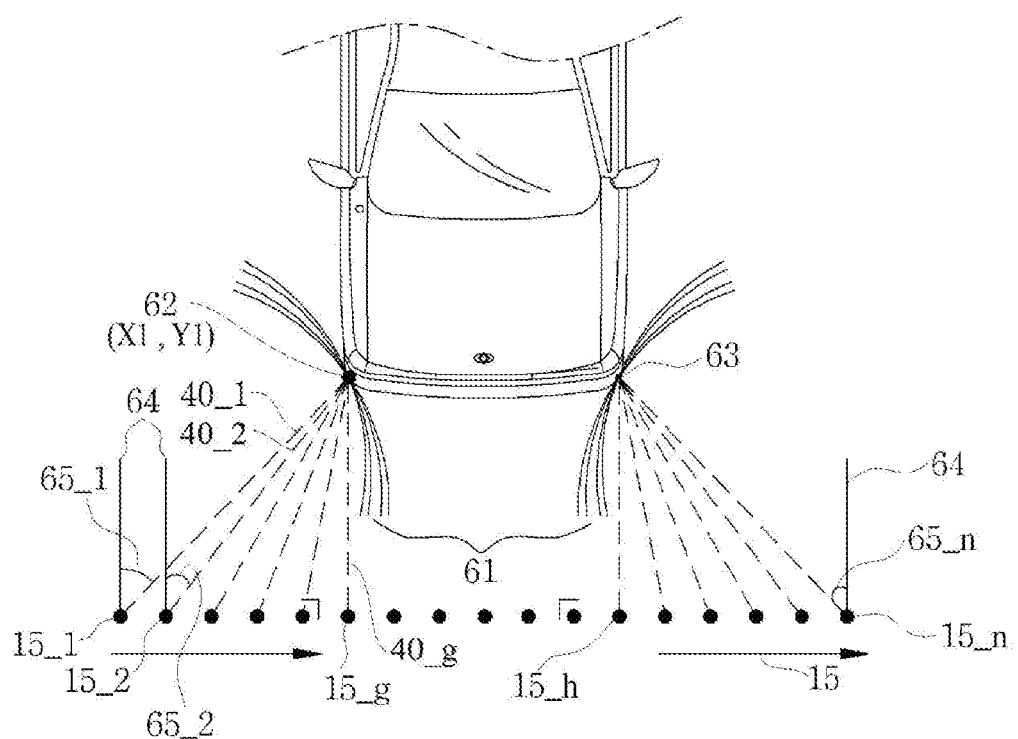
FIG. 6 is a diagram for describing a process of estimating a corner of an obstacle based on a pattern by the parking space detecting device according to the present invention.

Particularly, as illustrated in FIG. 6, the pattern-based corner estimating unit 121 configures a plurality of circles 61 having the plurality of measured distances, which are collected from the reflection signal, as radiuses, and extracts crossing points 62 and 63 of the respective configured circles 61.

For example, when a first distance value 40_1 is calculated based on the reflection signal received from the ultrasonic sensor at a first position 15_1, the pattern-based corner estimating unit 121 configures the circle 61 having the first distance value 40_1 as the radius based on the first position 15_1 of the ultrasonic sensor.

Similarly, when a second distance value 40_2 is calculated based on the reflection signal, which the ultrasonic sensor moving to a second position 15_2 received at the second position 15_2, the pattern-based corner estimating unit 121 configures another circle 61 having the second distance value 40_2 as the radius based on the second position 15_2.

By the same method, the pattern-based corner estimating unit 121 generates the plurality of circles 61 until the ultrasonic sensor moves to an $n^{th}$ position 15_n.

The pattern-based corner estimating unit 121 obtains a crossing point 62 of the plurality of generated circles 61.

As an example, the pattern-based corner estimating unit 121 may obtain the point, at which the predetermined number of circles cross, as the crossing point 62. As another example, the pattern-based corner estimating unit 121 may obtain high-rank two points, at which the largest number of circles among the plurality of virtual circles 61 generated by the pattern-based corner estimating unit 121 cross, as the crossing point 62.

The pattern-based corner estimating unit 121 estimates reflection angles 65_1, 65_2, ..., and 65_g between a first line 64 for bisecting a detection range of each of the ultrasonic sensors, and second lines 40_1, 40_2, ..., and 40_g for connecting current positions 15_1, 15_2, ..., and 15_g of the ultrasonic sensor and the crossing point 62.

The reflection angles are estimated from one corner section of the parked vehicle to an opposite corner section of the parked vehicle.

Figure 7A:
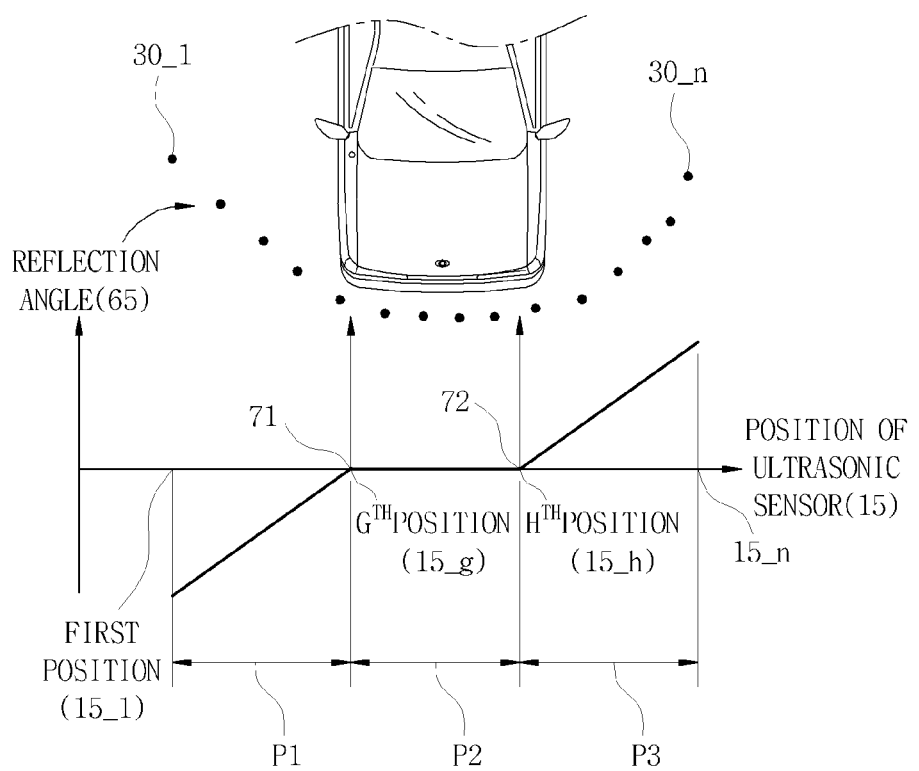
FIGS. 7A and 7B are graphs illustrating a reflection angle generated in the process of estimating a corner of an obstacle based on the pattern according to the present invention.

As described above, when all of the reflection angles are estimated from one corner section of the parked vehicle to the opposite corner section of the parked vehicle, a process of estimating an inflection point is performed as illustrated in FIG. 7A.

In the process of estimating the inflection point, a first section P1 in which the reflection angle is decreased, a second section P2 which is continued from the first section P1 and in which the reflection angle is maintained at 0°, and a third section P3 which is continued from the second section P2 and in which the reflection angle is increased are estimated. The inflection point includes a start point 71 and an end point 72 of the second section P2.

The first section P1 is estimated from a rate of change in the reflection angles 65_1 to 65_g with respect to the first crossing point 62 in the section between the first position 15_1 to a $g^{th}$ position 15_g of the ultrasonic sensor.

The third section P3 is estimated from a rate of change in the reflection angles 65_h to 65_n with respect to a second crossing point 63 in the section between an $h^{th}$ position 15_h to the $n^{th}$ position 15_n of the ultrasonic sensor.

The second section P2 is estimated from a rate of change in the reflection angle in the section between the $g^{th}$ position 15_g and the $h^{th}$ position 15_h of the ultrasonic sensor. In this case, the rate of the change in the reflection angle in the second section P2 is maintained at 0°.

Through the aforementioned process, a graph having a reflection angle 65 as a y-axis and the position 15 of the ultrasonic sensor as an x-axis may be generated as illustrated in FIG. 7A. In this case, the x-axis may be an x-coordinate of the position 15 of the ultrasonic sensor.

When an obstacle is a parked vehicle, a bumper surface of the vehicle has a curved shape, so that inflection points 71 and 72 may be extracted around a license plate of the parked vehicle.

The extracted inflection points 71 and 72 are not points extracted from a lateral surface of the parked vehicle, so that the extracted inflection points 71 and 72 may not be modeled as an actual parking space. Accordingly, a corner section actually existing on a lateral surface of another vehicle is estimated through distance compensation of the inflection points 71 and 72. Here, the coordinate of the position of the distance compensated corner section may be a value of the x-coordinate.

As an example, the pattern-based corner estimating unit 121 determines whether the obstacle is a vehicle or a structure (for example, a square pillar) by measuring a length of a ghost echo in the generated graph. Here, the ghost echo is a section in which a rate of change in the reflection angle exists, and refers to the first and third sections P1 and P3, and a length of the ghost echo may be defined as a length of each of the first and third sections P1 and P3.

A length of the ghost echo for determining whether the obstacle is a vehicle may be compared with a predetermined length.

For example, when a length of the ghost echo is equal to or greater than the predetermined length as illustrated in FIG. 7A, the obstacle is classified as a vehicle. Otherwise, the obstacle is classified as a structure, such as a square pillar.

As illustrated in FIG. 7A, when the length of the ghost echo is confirmed, and the obstacle is classified as the parked vehicle, the pattern-based corner estimating unit 121 compensates for the x-coordinate of the inflection point by a predetermined compensation distance value, and compensates for the x-coordinate to the corner section of the obstacle. Here, the predetermined compensation distance value may be set through a general width of a vehicle and an experiment several times.

The pattern-based corner estimating unit 121 may calculate the x-coordinates for the corner section of one side of the parked vehicle by subtracting the compensation distance value from the x-coordinates of the first inflection point 71, and calculate the x-coordinate for a corner section of another side of the parked vehicle by adding the compensation distance value to the x-coordinate of the second inflection point 72.

Through the aforementioned process, the pattern-based corner estimating unit 121 may calculate the value of the x-coordinate, which is calculated by subtracting the compensation distance value from the x-coordinate of the first inflection point 71, and the value of the y-coordinate of the first crossing point 62 as position coordinates (X1, Y1) of a first corner of the obstacle. Similarly, the pattern-based corner estimating unit 121 may calculate the value of the x-coordinate, which is calculated by adding the compensation distance value to the x-coordinate of the second inflection point 72 and the value of the y-coordinate of the second crossing point 63 as position coordinates of a second corner of the obstacle.

Figure 7B:
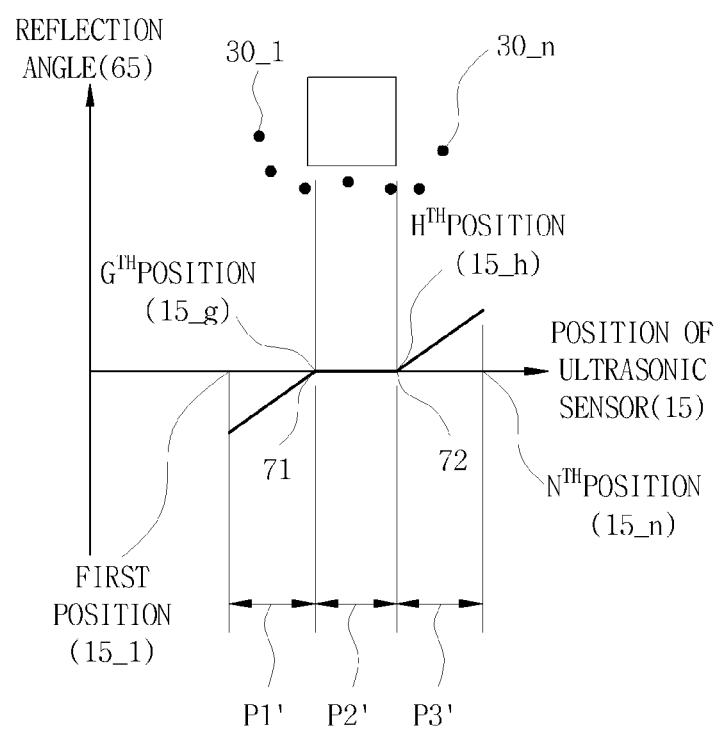

When lengths of ghost echo sections P1' and P3' are smaller than the predetermined length as illustrated in FIG. 7B, the obstacle is classified as a structure, such as a square pillar, and the pattern-based corner estimating unit 121 does not separately compensate for the x-coordinate of the inflection point. That is, the starting point 71 and the end point 72 of the second section P2' are estimated as the coordinates corresponding to the corner section as they are.

The reason is that the ghost echo sections P1' and P3' presented by the structure are relatively shorter than the ghost echo sections P1 and P3 presented by the vehicle, so that the inflection point almost corresponds to the corner point where the detection of the obstacle (structure) is ended.

2. Corner Estimation Performed by the Reflection Angle-Based Corner Estimating Unit 122

The reflection angle-based corner estimating unit 122 estimates positions of corners of an obstacle by using the reflection angle 65 at the position 15 of the ultrasonic sensor. In this case, the reflection angle-based corner estimating unit 122 may generate graphs illustrated in FIGS. 7A and 7B by obtaining a reflection angle at a position of each of the ultrasonic sensors through the same process as that of the pattern-based corner estimating unit 121. Specific description thereof will be omitted.

As an example, the reflection angle-based corner estimating unit 122 obtains candidate corner points 75 indicating an outer side of the obstacle by calculating the position 15 of the ultrasonic sensor, a distance value 40 of a reflection signal 30 at a corresponding position of the ultrasonic sensor, and the reflection angle 65 at the corresponding position of the ultrasonic sensor.

The reflection angle-based corner estimating unit 122 may estimate any two points among the obtained candidate corner points 75 as the corners of the obstacle. In this case, the reflection angle-based corner estimating unit 122 obtains the candidate corner points 75 by using Equation 1.

$$x_{75}=x_{15}+d_{40}\times\sin(\theta_{65})$$

$$y_{75}=y_{15}+d_{40}\times\cos(\theta_{65}) \quad \text{[Equation 1]}$$

Here, $x_{15}$, $y_{15}$ are position coordinates at the position 15 of the ultrasonic sensor, $d_{40}$ is the distance value 40 of the reflection signal 30 at the corresponding position of the ultrasonic sensor, and $\theta_{65}$ is the reflection angle 65 at the corresponding position of the ultrasonic sensor.

Figure 8:
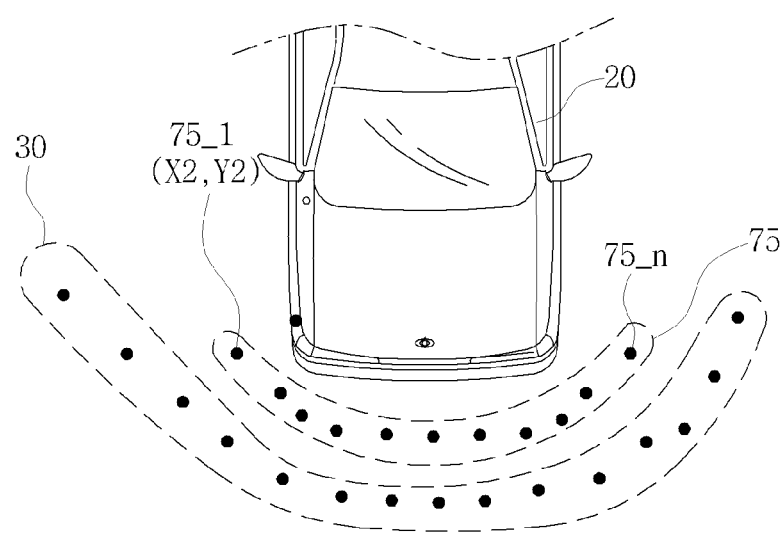
FIG. 8 is a diagram for describing a process of estimating a corner of an obstacle based on a reflection angle by the parking space detecting device according to the present invention.

Accordingly, the reflection angle-based corner estimating unit 122 may obtain the candidate corner points 75 indicating the outer side of an obstacle 20 as exemplified in FIG. 8.

The reflection angle-based corner estimating unit 122 may calculate the position coordinates by estimating the points, which are positioned at both ends among the obtained candidate corner points 75, as final corners of the obstacle. For example, the reflection angle-based corner estimating unit 122 may estimate the point having the smallest value of the x-coordinate and the point having the greatest value of the x-coordinate among the candidate corner points 75 as the final corners of the obstacle. In this case, the reflection angle-based corner estimating unit 122 may calculate position coordinates (X2, Y2) of a first corner by estimating the candidate corner point having the smallest value of the x-coordinate as a position of the first corner of the obstacle.

The reflection angle-based corner estimating unit 122 may calculate position coordinates of a second corner by estimating the candidate corner point having the greatest value of the x-coordinate as a position of the second corner of the obstacle.

As another example, the reflection angle-based corner estimating unit 122 may estimate the positions of the corners of the obstacle by using only reflection signals positioned at both ends among the reflection signals 30 received from the ultrasonic sensor.

For example, the reflection angle-based corner estimating unit 122 may calculate the position coordinates (X2, Y2) for the first corner of the obstacle by calculating the position coordinates of the first position 15_1 of the ultrasonic sensor, at which the reflection signal starts to be received according to the movement of the vehicle, the first distance value 40_1, and the first reflection angle 65_1 through Equation 1.

Similarly, the reflection angle-based corner estimating unit 122 may calculate the position coordinates for the second corner of the obstacle by calculating the position coordinates of the $n^{th}$ position 15_n of the ultrasonic sensor, at which the reflection signal is lastly received from the ultrasonic sensor according to the movement of the vehicle, the $n^{th}$ distance value 40_n, and the $n^{th}$ reflection angle 65_n through Equation 1.

3. Corner Estimation Performed by the Triangulation-Based Corner Estimating Unit 123

The triangulation-based corner estimating unit 123 estimates positions of corners of an obstacle by performing triangulation on the reflection signals 30 at the position 15 of the ultrasonic sensor. In this case, the triangulation-based corner estimating unit 123 may estimate the positions of the corners of the obstacle by generating the graphs of FIGS. 7A and 7B through the same process as that of the pattern-based corner estimating unit 121. Specific description thereof will be omitted.

The triangulation-based corner estimating unit 123 estimates the corner section by using estimated corner points extracted from m points (ghost echo points) (here, m is a natural number equal to or greater than 2), at which the reflection angle is increased and decreased, among points positioned at the plurality of measurement distances by using the triangulation method.

The triangulation-based corner estimating unit 123 estimates the corner positions of the obstacle by using reflection signals before the $g^{th}$ position 15_g and reflection signals after the $h^{th}$ position 15_h. For example, the triangulation-based corner estimating unit 123 estimates a position of a first corner by using the reflection signals 30_1 to 30_g received in the $g^{th}$ position 15_g from the first position 15_1 of the ultrasonic sensor.

Similarly, the triangulation-based corner estimating unit 123 estimates a position of a second corner by using the reflection signals 30_h to 30_n received in the $n^{th}$ position 15_n from the $h^{th}$ position 15_h of the ultrasonic sensor.

Hereinafter, the corner estimation based on the triangulation-based corner estimating unit 123 will be described based on the method of estimating the position of the first corner as an example.

The triangulation-based corner estimating unit 123 takes positions of the adjacent two ultrasonic sensors as centers of the circles, respectively, and calculates a point, at which two virtual circles generated by adopting distance values of the reflection signals at the positions of the ultrasonic sensors as radiuses cross, as the candidate corner point of the obstacle. In this case, the process of generating the virtual circle is the same as the process of generating the virtual circle for calculating the reflection angle by the pattern-based corner estimating unit 121.

Figure 9A:
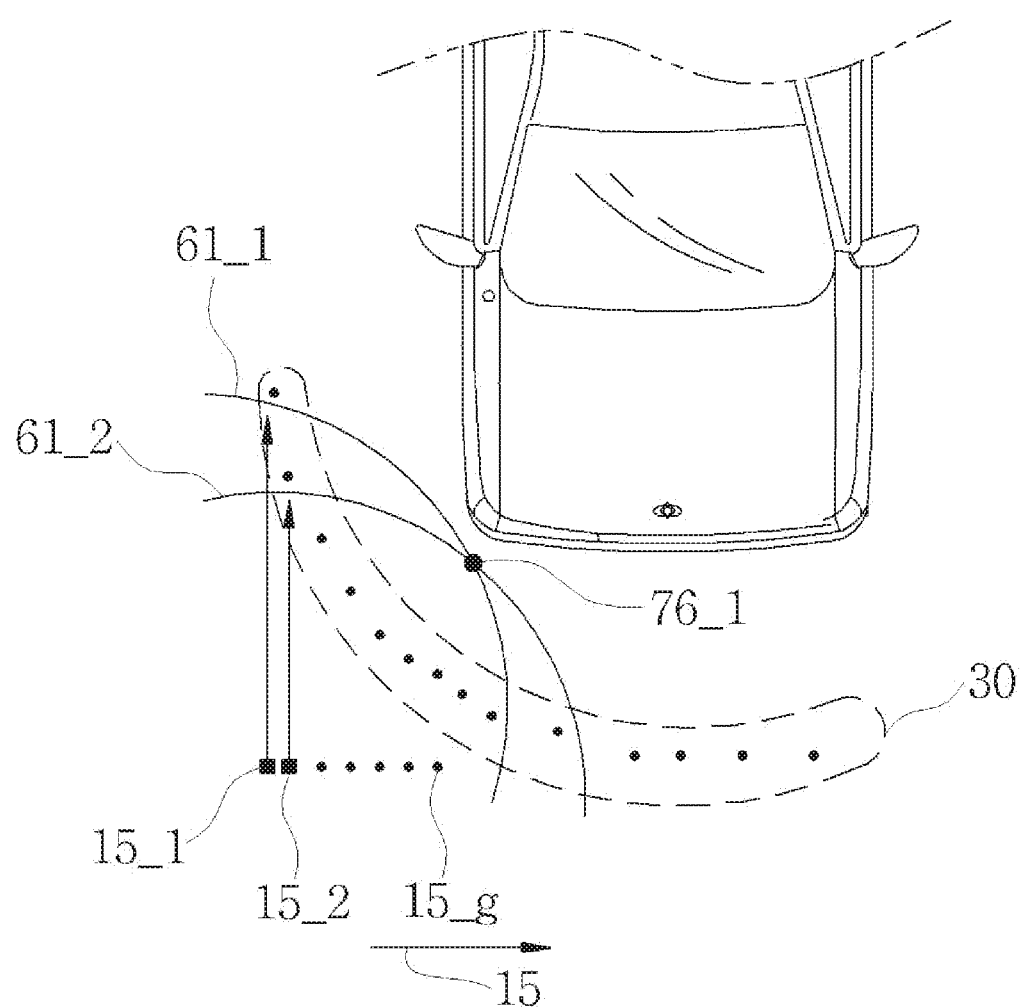
FIGS. 9A and 9B are diagrams for describing a process of estimating a corner of an obstacle based on triangulation by the parking space detecting device according to the present invention.

For example, as illustrated in FIG. 9A, the triangulation-based corner estimating unit 123 may obtain a point 76_1 at which a first circle 61_1 and a second circle 61_2 generated based on the first position 15_1 and the second position 15_2 of the ultrasonic sensor, respectively, cross, a point 76_g–1 at which a g–$1^{th}$ circle 61_g–1 and a $g^{th}$ circle 61_g generated based on a g–$1^{th}$ position 15_g–1 and the $g^{th}$ position 15_g of the ultrasonic sensor, respectively, cross, and the like, as candidate corner points 76 for the first corner of the obstacle. The candidate corner points 76 obtained as described above may be distributed as illustrated in FIG. 9B.

Figure 9B:
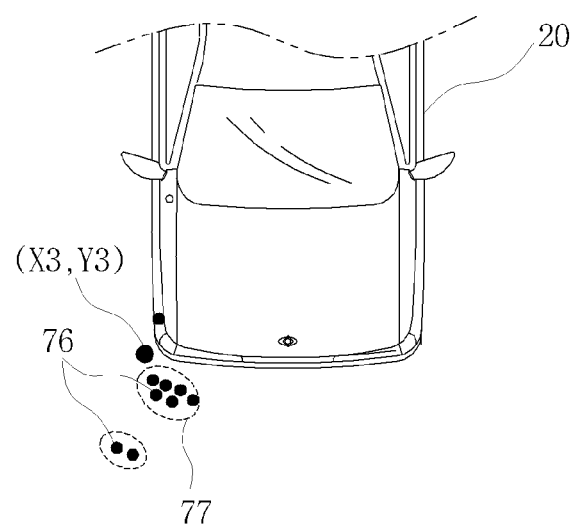

The triangulation-based corner estimating unit 123 filters a point having high reliability positioned within a predetermined region 77 among the candidate corner points 76 distributed as illustrated in FIG. 9B. In this case, the triangulation-based corner estimating unit 123 may obtain any one point as a reference point by performing a statistical method, such as standard deviation and average, on the candidate corner points 76, and a region, in which a standard deviation range is within 1 sigma (about 68%) based on the reference point, may be set to the predetermined region 77.

Accordingly, points positioned in a region having relatively low reliability (a region other than the predetermined region 77) due to erroneous recognition are excluded, so that accuracy in the estimation of the corner may be finally improved.

The triangulation-based corner estimating unit 123 may finally estimate the position of the first corner of the obstacle by using a compensation logic for the candidate corner points positioned within the predetermined region 77, and calculate position coordinates (X3, Y3) for the estimated position of the first corner. For example, the triangulation-based corner estimating unit 123 may calculate position coordinates (X3, Y3) for the first corner of the obstacle by calculating an average of the coordinates of each of the candidate corner points positioned within the predetermined region 77.

Similarly, the triangulation-based corner estimating unit 123 may obtain a point 76_h at which an $h^{th}$ circle 61_h and an h+$1^{th}$ circle 61_h+1 generated based on the $h^{th}$ position 15_h and the h+$1^{th}$ position 15_h+1 of the ultrasonic sensors, respectively, cross, a point 76_n–1 at which an n–$1^{th}$ circle 61_n–1 and an $n^{th}$ circle 61_n generated based on the n–$1^{th}$ position 15_n–1 and the $n^{th}$ position 15_n of the ultrasonic sensors, respectively, cross, and the like, as the candidate corner points for the second corner of the obstacle.

4. Corner Estimation Performed by the Sensor Map-Based Corner Estimating Unit 124

Figure 10A:
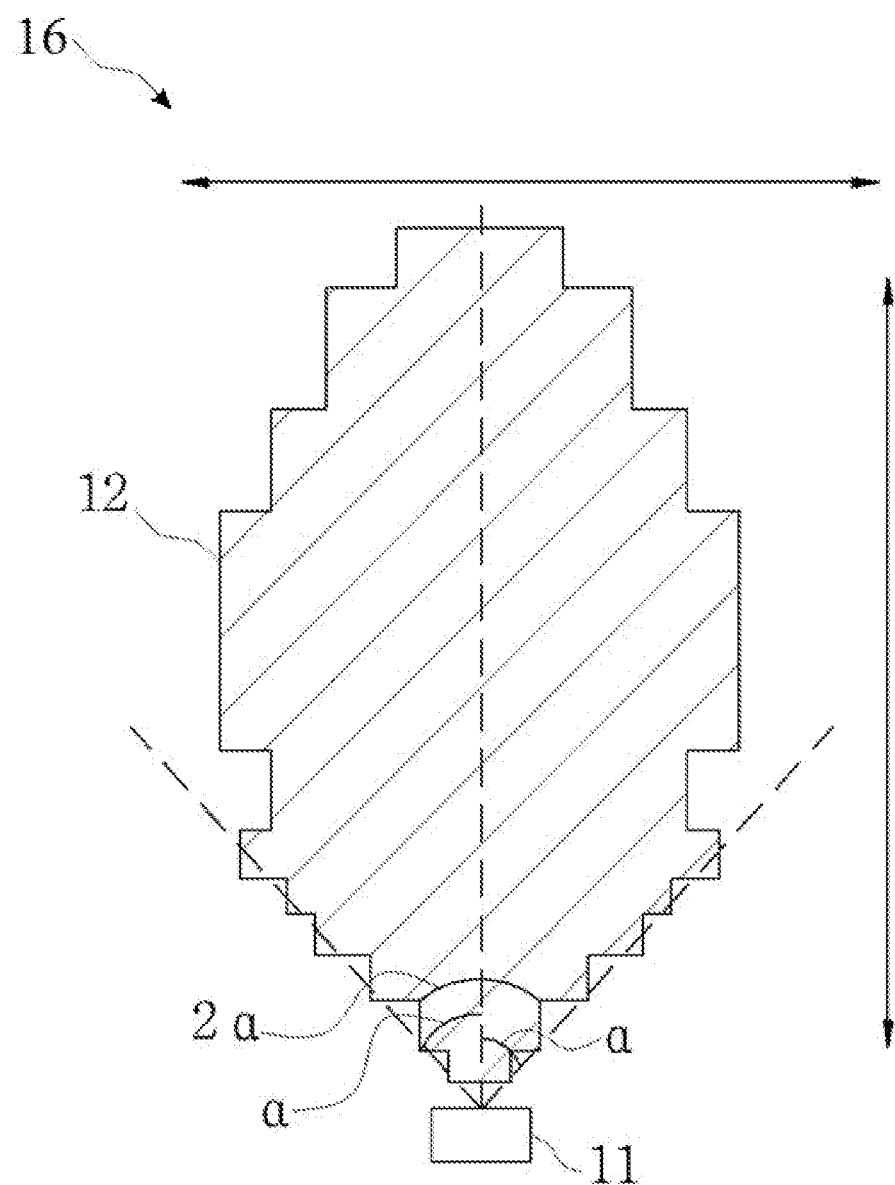
FIGS. 10A, 10B, and 10C are diagrams for describing a process of estimating a corner of an obstacle based on a sensor map by the parking space detecting device according to the present invention.

The sensor map-based corner estimating unit 124 estimates positions of corners of an obstacle by using detection range data (unique detection angle) of the ultrasonic sensor. Here, it is possible to recognize a unique detection range according to unique specifications of the ultrasonic sensor mounted in a vehicle, and also recognize a detection angle. For example, as exemplified in FIG. 10A, it is possible to recognize a detection range 12 of a sensor map 16 in which the ultrasonic sensor 11 may detect an obstacle, and a detection angle 2α at which an obstacle is detectable based on the ultrasonic sensor.

The sensor map-based corner estimating unit 124 estimates positions of corners of an obstacle by using a detection angle of the ultrasonic sensor under the assumption that the reflection signal is received from an outer border line of the detection range of the ultrasonic sensor.

The sensor map-based corner estimating unit 124 estimates the position of the corner of the obstacle by using a detection angle α that is ½ of the detection angle 2α. For example, the sensor map-based corner estimating unit 124 may estimate the position of the corner of the obstacle by moving the reflection signal 30 received at the position 15 of the ultrasonic sensor by the ½ detection angle α.

As an example, the sensor map-based corner estimating unit 124 may estimate the position of the corner of the obstacle by moving the first reflection signal 30_1 at the first position 15_1 of the ultrasonic sensor, at which the reflection signal starts to be received, and an $n^{th}$ reflection signal 30_n at the $n^{th}$ position 15_n of the ultrasonic sensor, at which the reflection signal is lastly received, by the ½ detection angle α. That is, the sensor map-based corner estimating unit 124 may estimate the position of the corner of the obstacle by moving the reflection signals 30_1 and 30_n at both ends among the reflection signals 30 by the ½ detection angle α.

Figure 10B:
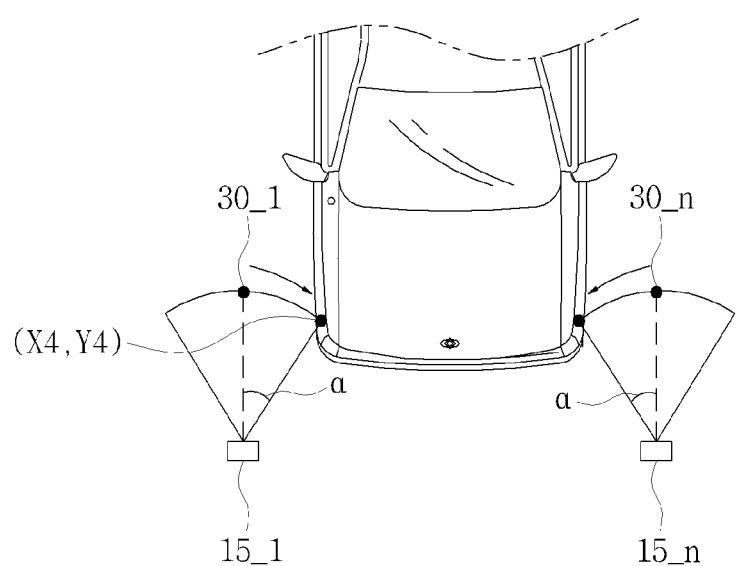

In this case, as exemplified in FIG. 10B, the sensor map-based corner estimating unit 124 may estimate a point, to which the first reflection signal 30_1 moves by the ½ detection angle α in a right direction, as a position of a first corner of the obstacle, and calculate position coordinates (X4, Y4) of the first corner.

The sensor map-based corner estimating unit 124 may estimate a point, to which the nth reflection signal 30_n moves by the ½ detection angle α in a left direction, as a position of a second corner of the obstacle, and calculate position coordinates of the second corner For another example, the sensor map-based corner estimating unit 124 may obtain candidate corner points of the obstacle by moving the reflection signals 30, which are received at the position 15 of the ultrasonic sensor, by the ½ detection angle α. For example, as exemplified in FIG. 10C, the sensor map-based corner estimating unit 124 obtains first candidate corner points 13 for estimating the position of the first corner by moving the reflection signals 30_1 to 30_g before the $g^{th}$ reflection signal 30_g, which is obtained by the pattern-based corner estimating unit 121 in the right direction by the ½ detection angle α.

The sensor map-based corner estimating unit 124 obtains second candidate corner points 14 for estimating the position of the second corner by moving the reflection signals 30_h to 30_n after the $h^{th}$ reflection signal 30_h in the left direction by the ½ detection angle α.

The sensor map-based corner estimating unit 124 may calculate position coordinates (X4, Y4) for the first corner by using a statistical method, such as standard deviation and average, of the position coordinates of the first candidate corner points 13.

The sensor map-based corner estimating unit 124 may calculate position coordinates for the second corner by using a statistical method, such as standard deviation and average, of the obtained position coordinates of the second candidate corner points 14.

In the meantime, the corner estimating unit 120 may further include a final corner estimating unit 126 for finally estimating position coordinates for a corner section of the obstacle by converging the position coordinates of the corner calculated by each of the pattern-based corner estimating unit 121, the reflection angle-based corner estimating unit 122, the triangulation-based corner estimating unit 123, and the sensor map-based corner estimating unit 124. Accordingly, the corner estimating unit 120 may improve accuracy in estimating the corners of the obstacle.

For example, the final corner estimating unit 126 finally calculates position coordinates (X, Y) for the corners of the obstacle by calculating weights W1, W2, W3, and W4 and each of the position coordinates of the corners (X1, Y1), (X2, Y2), (X3, Y3), and (X4, Y4), respectively, calculated from the pattern-based corner estimating unit 121, the reflection angle-based corner estimating unit 122, the triangulation-based corner estimating unit 123, and the sensor map-based corner estimating unit 124, respectively. In this case, the final corner estimating unit 126 calculates the final position coordinates (X, Y) for the corners of the obstacle by using Equation 2.

$$X = \frac{QW_i X_i}{QW_i} = \frac{W_1 X_1 + W_2 X_2 + W_3 X_3 + W_4 X_4}{W_1 + W_2 + W_3 + W_4}$$
$$Y = \frac{QW_i Y_i}{QW_i} = \frac{W_1 Y_1 + W_2 Y_2 + W_3 Y_3 + W_4 Y_4}{W_1 + W_2 + W_3 + W_4}$$

[Equation 2]

Here, $W_i$ is a predetermined weight value, and a weight value preset according to reliability for each of the pattern-based corner estimating unit 121, the reflection angle-based corner estimating unit 122, the triangulation-based corner estimating unit 123, and the sensor map-based corner estimating unit 124.

Through the process, the corner estimating unit 120 may estimate the positions of the corners of the obstacle.

Hereinafter, the parking space detecting unit 130 illustrated in FIG. 2 will be described in detail.

The parking space detecting unit 130 detects a parking space for parking the vehicle by considering the coordinates of the positions of the corner estimated by the corner estimating unit 120. In this case, the parking space detecting unit 130 may detect a parking space by defining an inclination of the reflection signals according to the detection of the obstacle as an inclination of the parking space as exemplified in FIG. 11.

For example, the inclination of the parking space may be differently defined according to whether the obstacle present around the detected parking space is a structure 85, such as a wall, a pillar, and a curb, or another vehicle. In this case, the parking space detecting unit 130 may confirm whether the obstacle is a structure or a parked vehicle through the corner estimating unit 120 (for example, the pattern-based corner estimating unit 121).

As a result of the confirmation, when the obstacle is a structure, the parking space detecting unit 130 extracts a straight line 81 representing the structure, and defines the inclination representing the structure as the inclination of the parking space. In this case, the straight line representing the structure may be parallel to the vehicle. Here, a noise ultrasonic signal 83 is filtering-processed, so that the noise ultrasonic signal 83 is not reflected when the inclination of the parking space is calculated.

When the structure, such as a wall or a curb, is not present, the parking space detecting unit 130 extracts an inclination 82 of another parked vehicle and defines the extracted inclination as the inclination of the parking space.

The parking space detecting unit 130 confirms a width 84 of the parking space, in which the vehicle may be parked, by using a distance between the vehicle and the structure or another vehicle. In this case, the parking space detecting unit 130 may confirm the width 84 of the parking space through a distance value of the reflection signal received from the ultrasonic sensor.

The parking space detecting unit 130 determines a target parking space according to whether the parking space is available for parking the vehicle by detecting an opposite obstacle 91 positioned in an opposite direction of the parking space. In this case, the opposite obstacle 91 refers to an obstacle detected by the ultrasonic sensor mounted in an opposite direction of the parking space based on a vehicle 10. That is, the opposite obstacle is an obstacle positioned in an opposite direction to the direction of the parking space in which a driver desires to park the vehicle 10.

Figure 12:
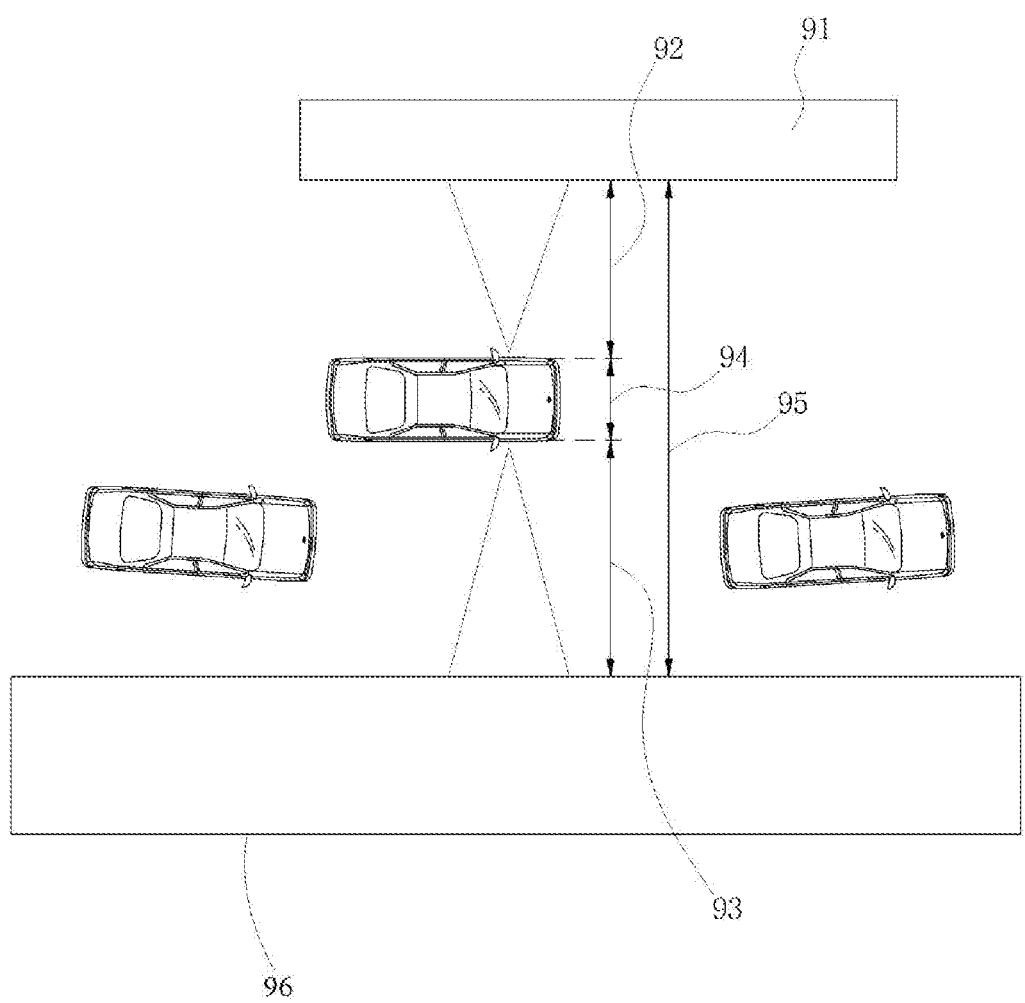
FIG. 12 is a diagram for describing an operation of recognizing an obstacle at an opposite side by the parking space detecting device according to the present invention.

The parking space detecting unit 130 determines whether the parking of the vehicle is available by confirming a distance 92 with the opposite obstacle 91 during the detection of the parking space or after the detection of the parking space as illustrated in FIG. 12.

The reason is that even though the parking space enabling the parking of the vehicle is detected, the vehicle 10 may be in contact with the opposite obstacle 91 while moving to the parking space for parking.

As an example, when the distance 92 between the vehicle and the opposite obstacle 91 is equal to or smaller than a predetermined threshold value, the parking space detecting unit 130 processes the detected parking space to be non-recognized even though the parking space is detected.

For another example, when a width 95 of the entire road between the obstacle 91 and an obstacle 96 is equal to or smaller than a predetermined threshold width, the parking space detecting unit 130 determines that the parking is not available, and processes the detected parking space to be non-recognized.

Here, the width 95 of the entire road is a sum of a distance from the ultrasonic sensor in the direction, in which a driver desires to park the vehicle, to the obstacle detected in the direction of the parking space, that is, a width 93 of the parking space, a width 94 of the vehicle, and a distance 92 from the opposite ultrasonic sensor in the direction, in which the driver desires to park the vehicle, to the opposite obstacle.

As described above, according to the exemplary embodiment of the present invention, the position of the corner of the obstacle, which is not detected due to the shape of the obstacle or various environment factors according to the characteristic of the ultrasonic sensor, is estimated, thereby improving accuracy in detecting the parking space for parking the vehicle.

According to the exemplary embodiment of the present invention, the target parking space for parking the vehicle is determined by further detecting the obstacle positioned in the opposite direction of the parking space in which the driver desires to park the vehicle, thereby improving general performance of the smart parking assist system (SPAS) of the vehicle.

Figure 13:
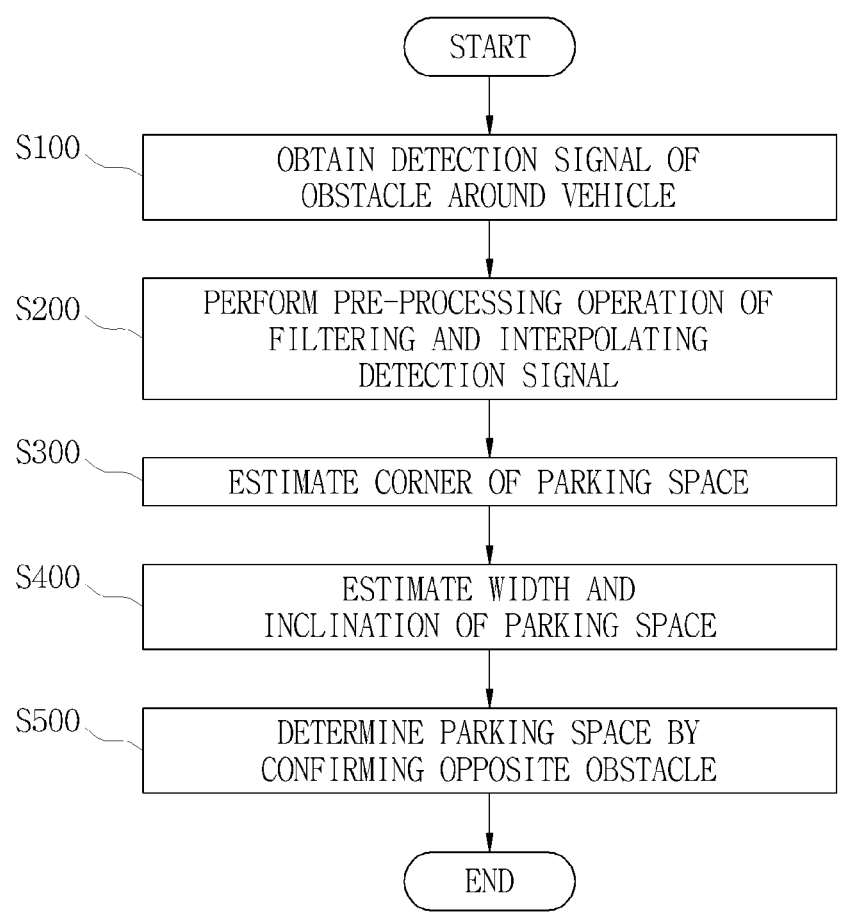
FIG. 13 is a flowchart illustrating an operation of the parking space detecting device according to an exemplary embodiment of the present invention.

FIG. 13 is a flowchart illustrating an operation of the parking space detecting device according to an exemplary embodiment of the present invention.

In operation S100, the parking space detecting device 100 obtains reflection signals according to detection of an obstacle positioned around a vehicle. Here, the parking space detecting device 100 may obtain the reflection signals according to the detection of the obstacle around the vehicle through a plurality of ultrasonic sensors mounted at predetermined positions at front, rear, left, and right sides of the vehicle.

The received reflection signal is a signal according to the detection of the obstacle positioned in side directions of the vehicle during forward or reverse travelling of the vehicle for parking. For example, the detection of the parking space is requested from a user (the smart parking assist system is turned on), and then an obstacle in the side direction of the vehicle is detected while the vehicle forwardly or reversely travels at a predetermined speed or lower (for example, 10 km/h).

In operation S200, the parking space detecting device 100 performs a signal pre-processing operation for filtering and interpolating the obtained reflection signals. Here, the parking space detecting device 100 filters an inaccurate reflection signal among the reflection signals obtained in operation S100. In this case, the parking space detecting device 100 filters an inaccurate reflection signal by analyzing a distance value of each of the reflection signals. For example, as exemplified in FIG. 3A, an ultrasonic signal is not reflected from the obstacle 20 so that a non-detection region 31, in which the reflection signal is not received, may be generated, or an erroneous detection region 33, which is non uniform as compared to the adjacent reflection signals, may be generated due to noise or a fine curve of the obstacle.

The parking space detecting device 100 analyzes a tendency of the distance values of the received reflection signals 30, and filters (or interpolates) the inaccurate reflection signal, that is, the signal in a detection problem region, such as the non-detection region 31 or the erroneous detection region 33.

For example, the signal pre-processing unit 110 confirms a region, in which the distance value is sharply different by a predetermined distance value or greater as compared to those of the adjacent reflection signals, as the detection problem region, and interpolates the region. That is, the non-uniform reflection signal 31 or the inaccurate reflection signal 33 illustrated in FIG. 3A may be interpolated into a uniform reflection signal 35 as illustrated in FIG. 3B.

In operation S300, the parking space detecting device 100 estimates the position of the corner of the parking space by using the filtered reflected signals.

Here, the parking space detecting device 100 may calculate position coordinates of the corners of the obstacle by converging the position coordinates of the corners estimated by four corner estimating methods, such as the pattern-based corner estimating method, the reflection angle-based corner estimating method, the triangulation-based corner estimating method, and the sensor map-based corner estimating method.

The pattern-based corner estimating method is a method of calculating the position coordinates of the corners of the obstacle by classifying whether the obstacle is a vehicle or a structure, such as a pillar, and estimating the positions of the corners of the obstacle.

For example, the parking space detecting device 100 generates a graph for the reflection angle and the position of the ultrasonic sensor as illustrated in FIGS. 7A and 7B by obtaining the reflection angle 65 for each of the reflection signals 30, in which the obstacle is modeled, as exemplified in FIG. 6.

The parking space detecting device 100 extracts the inflection points 71 and 72 from the generated graph, and determines whether the obstacle is another vehicle or the structure according to lengths of the ghost echo sections P1 and P3.

The parking space detecting device 100 estimates the positions of the corners of the obstacle by determining the amount of distance compensation according to the obstacle, and calculates the position coordinates of the estimated corners.

The reflection angle-based corner estimating method is a method of estimating positions of corners of an obstacle by using the reflection angle 65 at the position 15 of the ultrasonic sensor. The reflection angle may be obtained at a position of each of the ultrasonic sensors through the same process as that of the pattern-based corner estimating method.

The parking space detecting device 100 obtains the candidate corner points 75 indicating an outer side of the obstacle by calculating the position 15 of the ultrasonic sensor, a distance value 40 of a reflection signal 30 at a corresponding position of the ultrasonic sensor, and the reflection angle 65 at the corresponding position of the ultrasonic sensor, through Equation 1.

As exemplified in FIG. 8, when the candidate corner points 75 indicating the outer side of the obstacle 20 are obtained, the parking space detecting device 100 estimates the points, which are positioned at both ends among the obtained candidate corner points 75, as the final corners of the obstacle, and calculates position coordinates of the final corners of the obstacle.

The triangulation-based corner estimating method is a method of estimating positions of corners of an obstacle by performing triangulation on the reflection signals 30 at the position 15 of the ultrasonic sensor.

Particularly, the parking space detecting device 100 takes positions of the adjacent two ultrasonic sensors as centers of the circles, respectively, and calculates a point, at which two virtual circles, which are generated by adopting distance values of the reflection signals at the positions of the ultrasonic sensors as radiuses cross, as a candidate corner point of the obstacle. Here, the parking space detecting device 100 may generate the virtual circle through the same process as that of the pattern-based corner estimating method.

The parking space detecting device 100 filters a point having high reliability positioned within a predetermined region 77 among the candidate corner points distributed as illustrated in FIG. 9B.

The parking space detecting device 100 estimates the position of the corner of the obstacle through a compensation logic of the candidate corner points within the predetermined region 77.

The sensor map-based corner estimating method is a method of estimating positions of corners of an obstacle by using detection range data of the ultrasonic sensor. Here, the detection range may be recognized according to unique specifications of the ultrasonic sensor mounted in the vehicle, and a detection angle may also be recognized.

The parking space detecting device 100 estimates positions of corners of an obstacle by using a detection angle of the ultrasonic sensor under the assumption that the reflection signal is received from an outer border line of the detection range of the ultrasonic sensor.

The parking space detecting device 100 estimates the positions of the corners of the obstacle by using a detection angle $\alpha$ that is ½ of the detection angle $2\alpha$ of the ultrasonic sensor. Here, the parking space detecting device 100 obtains the candidate corner points of the obstacle by moving the reflection signal 30, which is received at the position 15 of the ultrasonic sensor, by the ½ detection angle $\alpha$.

Figure 10C:
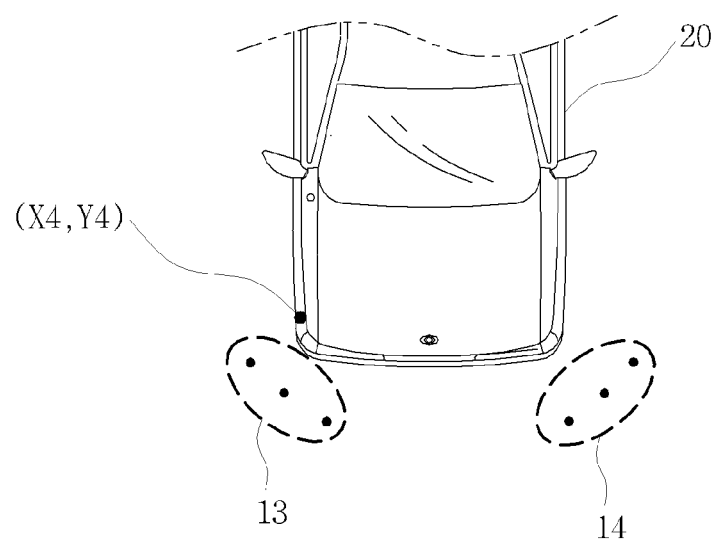

The parking space detecting device 100 may estimate the positions of the corners of the obstacle by performing a statistical method, such as standard deviation and average, on the position coordinates of the obtained candidate corner points as illustrated in FIG. 10C.

The parking space detecting device 100 may finally calculate the position coordinates of the corners of the obstacle by calculating the result, which is obtained by each of the pattern-based corner estimating method, the reflection angle-based corner estimating method, the triangulation-based corner estimating method, and the sensor map-based corner estimating method, and a weight.

In operation S400, the parking space detecting device 100 estimates a width and an inclination of the parking space. In this case, the parking space detecting unit 130 may define inclinations of the reflection signals according to the detection of the obstacle as inclinations of the parking space as exemplified in FIG. 11. For example, the inclination of the parking space may be differently defined according to whether the obstacle present around the detected parking space is a structure, such as a wall, a pillar, and a curb, or another vehicle.

Figure 11:
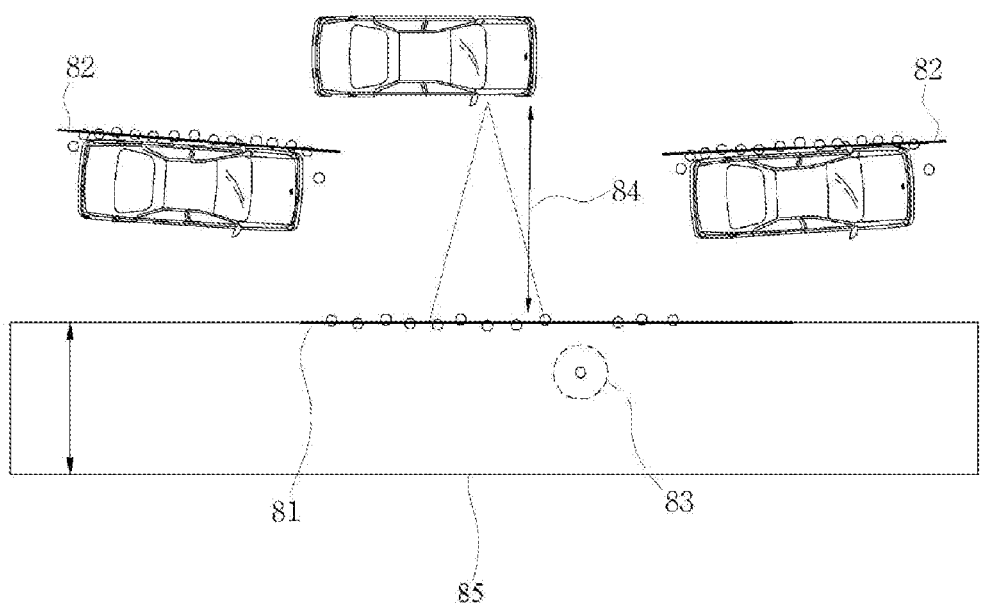
FIG. 11 is a diagram for describing an operation of detecting a parking space by the parking space detecting device according to the present invention.

For example, when the structure, such as a wall or a curb, is present in the detected parking space as illustrated in FIG. 11, the parking space detecting device 100 extracts a straight line 81 representing the wall/curb, and defines an inclination of the straight line as an inclination of the parking space.

When the structure, such as a wall or a curb, is not present, the parking space detecting device 100 extracts an inclination 82 of another vehicle and defines the extracted inclination as the inclination of the parking space. In this case, a noise ultrasonic signal 83 is filtering-processed, so that the noise ultrasonic signal 83 is not reflected when the inclination of the parking space is calculated.

In operation S500, the parking space detecting device 100 confirms an opposite obstacle positioned in an opposite direction of the parking space, and determines a target parking space. For example, the parking space detecting device 100 determines a target parking space according to whether the parking space is available for parking the vehicle by detecting an opposite obstacle 91 positioned in an opposite direction of the parking space as exemplified in FIG. 12. In this case, the opposite obstacle 91 refers to an obstacle detected by the ultrasonic sensor mounted in an opposite direction of the parking space based on the vehicle 10.

When a width 95 of the entire road is equal to or smaller than a predetermined threshold width, the parking space detecting device 100 determines that the parking is not available, and processes the detected parking space to be non-recognized. In this case, the width 95 of the entire road is a sum of a distance 93 from the ultrasonic sensor in the direction, in which the driver desires to park the vehicle, to the obstacle detected in the direction of the parking space, a width 94 of the vehicle, and a distance 92 from the opposite ultrasonic sensor in the direction, in which the driver desires to park the vehicle, to the opposite obstacle.

As described above, according to the exemplary embodiment of the present invention, the position of the corner of the obstacle, which is not detected due to the shape of the obstacle or various environment factors according to the characteristic of the ultrasonic sensor, is estimated, thereby improving accuracy in detecting the parking space for parking the vehicle.

According to the exemplary embodiment of the present invention, the target parking space for parking the vehicle is determined by further detecting the obstacle positioned in the opposite direction of the parking space in which the driver desires to park the vehicle, thereby improving general performance of the SPAS of the vehicle.

An embodiment of the present invention may be implemented in a computer system, e.g., as a computer readable medium. As shown in FIG. 14, a computer system 140 may include one or more of a processor 141, a memory 143, a user input device 146, a user output device 147, and a storage 148, each of which communicates through a bus 142. The computer system 140 may also include a network interface 149 that is coupled to a network 150. The processor 141 may be a central processing unit (CPU) or a semiconductor device that executes processing instructions stored in the memory 143 and/or the storage 148. The memory 143 and the storage 148 may include various forms of volatile or non-volatile storage media. For example, the memory may include a read-only memory (ROM) 144 and a random access memory (RAM) 145.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The configuration of the present invention have been described with reference to the exemplary embodiments of the present invention, but those skilled in the art will understand that the present invention may be implemented in another specific form without changing the technical spirit or an essential feature thereof. Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A device for detecting a parking space, comprising:
   a signal pre-processing unit configured to filter received ultrasonic signals which are reflected by a corner section of an obstacle, the ultrasonic signals being emitted from an ultrasonic sensor attached to a vehicle;
   a pattern-based corner estimating unit configured to:
   extract a crossing point of a plurality of circles each having a measurement distance as a radius, wherein the measurement distances are collected from the received ultrasonic signals according to a movement of the vehicle,
   estimate a reflection angle between a first line for bisecting a detection region of the ultrasonic sensor, which has a current position of the ultrasonic sensor as a reference point, and a second line for connecting the reference point and the crossing point, and
   estimate the corner section of the obstacle based on the estimated reflection angle; and
   a parking space detecting unit configured to detect a parking space for the vehicle according to the estimated corner section.

2. The device of claim 1, wherein the pattern-based corner estimating unit is configured to estimate the corner section of the obstacle based on a rate of change in the reflection angle according to the movement of the vehicle.

3. The device of claim 1, wherein the pattern-based corner estimating unit is configured to divide the corner section of the obstacle into a first section in which the reflection angle is decreased, a second section which is continued from the first section and in which the reflection angle is maintained at 0°, and a third section which is continued from the second section and in which the reflection angle is increased, to estimate the corner section of the obstacle.

4. The device of claim 3, wherein the pattern-based corner estimating unit is configured to compensate for a start point (inflection point) of the second section by a length of the first section, and is configured to compensate for an end point (inflection point) of the second section by a length of the third section, to estimate the corner section.

5. The device of claim 3, wherein the pattern-based corner estimating unit is configured to compare a length of each of the first and third sections with a predetermined length and classify the obstacle as one of a plurality of obstacle types.

6. The device of claim 5, wherein, in response to the length of each of the first and third sections being equal to or greater than the predetermined length, the pattern-based corner estimating unit is configured to classify the obstacle as a vehicle obstacle type from among the plurality of obstacle types, and
in response to the length of each of the first and third sections being smaller than the predetermined length, the pattern-based corner estimating unit is configured to classify the obstacle as a square pillar obstacle type from among the plurality of obstacle types.

7. The device of claim 6, wherein, in response to the obstacle being classified as the square pillar obstacle type, the pattern-based corner estimating unit is configured to estimate the start point and the end point of the second section as the corner section.

8. The device of claim 1, further comprising:
a reflection angle-based corner estimating unit configured to calculate a current position of the ultrasonic sensor, a distance to the corner section based on the ultrasonic signal received at the current position, and the reflection angle at the current position, to estimate the corner section of the obstacle;
a triangulation-based corner estimating unit configured to estimate the corner section by using estimated corner points extracted from m points (ghost echo points) (here, m is a natural number equal to or greater than 2), at which the reflection angle increases with a change in position of the ultrasonic sensor or decreases with a change in position of the ultrasonic sensor, among points positioned at the plurality of measurement distances by using a triangulation method; and
a sensor map-based corner estimating unit configured to estimate the corner section by using ultrasonic signals received from a periphery of an area within a detection range of the ultrasonic sensor, in which an initially received ultrasonic signal and a finally received ultrasonic signal from the obstacle according to a movement of the vehicle are formed by a unique detection angle of the ultrasonic sensor.

9. The device of claim 8, further comprising:
a final corner estimating unit configured to estimate a result value as a final corner section by dividing added weighted result values by a result value obtained by adding different predetermined weight values,
wherein the weighted result values are obtained by multiplying each of the coordinate values of the corner sections estimated by the pattern-based corner estimating unit, the reflection angle-based corner estimating unit, the triangulation-based corner estimating unit, and the sensor map-based corner estimating unit with a predetermined weight value of the corresponding unit.

10. A method of detecting a parking space, comprising:
filtering received ultrasonic signals which are reflected by a corner section of an obstacle, the ultrasonic signals being emitted from an ultrasonic sensor attached to a vehicle;
extracting a crossing point of a plurality of circles each having a measurement distance, which are collected from the received ultrasonic signals according to a movement of the vehicle, as radiuses;
estimating a reflection angle between a first line for bisecting a detection region of the ultrasonic sensor, which has an attachment position of the ultrasonic sensor as a reference point, and a second line for connecting the reference point and the crossing point;
estimating the corner section of the obstacle based on the estimated reflection angle; and
detecting a parking space for the vehicle according to the estimated corner section.

11. The method of claim 10, wherein the pattern-based corner estimating includes:
dividing the corner section into a first section in which the reflection angle is decreased, a second section which is continued from the first section and in which the reflection angle is maintained at 0°, and a third section which is continued from the second section and in which the reflection angle is increased, based on a rate of change in the reflection angle according to the movement of the vehicle, and estimating a start point (inflection point) and an end point (inflection point) of the second section;
comparing a length of each of the first and third sections with a predetermined length and classifying the obstacle as one of a plurality of obstacle types;
determining the amount of compensation of the start point and the end point of the second section according to the classified one of the plurality of obstacle types; and
estimating the start point and the end point of the second section, which are compensated according to the determined amount of compensation, as the corner section.

12. The method of claim 11, wherein the classifying of the obstacle includes classifying the obstacle as a vehicle obstacle type, from among the plurality of obstacle types, in response to the length of each of the first and third sections being equal to or greater than the predetermined length, and classifying the obstacle as a square pillar obstacle type, from among the plurality of obstacle types, in response to the length of each of the first and third sections being smaller than the predetermined length.

13. The method of claim 12, wherein the determining of the amount of compensation includes, in response to the obstacle being classified as the vehicle obstacle type, determining the amount of compensation of the start point (inflection point) of the second section as the length of the first section, and determining the amount of compensation of the end point (inflection point) of the second section as the length of the third section.

14. The method of claim 12, wherein the estimating of the start point and the end point of the second section as the corner section includes, in response to the obstacle being classified as the square pillar obstacle type, estimating the start point and the end point of the second section as the corner section as they are without the amount of compensation.

15. The method of claim 10, further comprising:
calculating a current position of the ultrasonic sensor, a distance to the corner section based on the ultrasonic signal received at the current position, and the reflection angle at the current position, to estimate the corner section of the obstacle;
estimating the corner section by using estimated corner points extracted from m points (ghost echo points) (here, m is a natural number equal to or greater than 2), at which the reflection angle increases with a change in position of the ultrasonic sensor or decreases with a change in position of the ultrasonic sensor, among points positioned at the plurality of measurement distances by using a triangulation method; and estimating the corner section by using ultrasonic signals received from a periphery of an area within a detection range of the ultrasonic sensor, in which an initially received ultrasonic signal and a finally received ultrasonic signal from the obstacle according to a movement of the vehicle are formed by a unique detection angle of the ultrasonic sensor.

16. The method of claim 15, further comprising:

estimating a result value as a final corner section by dividing added weighted result values by a result value obtained by adding different predetermined weight values, wherein the weighted result values are obtained by multiplying each of the coordinate values of the corner sections estimated by the pattern-based corner estimating unit, the reflection angle-based corner estimating unit, the triangulation-based corner estimating unit, and the sensor map-based corner estimating unit with a predetermined weight value of the corresponding unit.

* * * * *